US010982961B2

(12) United States Patent
Sumizawa

(10) Patent No.: US 10,982,961 B2
(45) Date of Patent: Apr. 20, 2021

(54) VEHICLE CONTROL SYSTEM AND VEHICLE CONTROL DEVICE

(71) Applicants: HITACHI AUTOMOTIVE SYSTEMS, LTD., Hitachinaka (JP); CLARION CO., LTD., Saitama (JP)

(72) Inventor: Akio Sumizawa, Ibaraki (JP)

(73) Assignees: HITACHI AUTOMOTIVE SYSTEMS, LTD., Hitachinaka (JP); CLARION CO., LTD., Saitama (JP)

(*) Notice: Subject to any disclaimer, the term of this patent is extended or adjusted under 35 U.S.C. 154(b) by 372 days.

(21) Appl. No.: 15/767,260

(22) PCT Filed: Oct. 12, 2016

(86) PCT No.: PCT/JP2016/080273
§ 371 (c)(1),
(2) Date: Apr. 10, 2018

(87) PCT Pub. No.: WO2017/065182
PCT Pub. Date: Apr. 20, 2017

(65) Prior Publication Data
US 2019/0078897 A1   Mar. 14, 2019

(30) Foreign Application Priority Data
Oct. 16, 2015 (JP) .............................. JP2015-204670

(51) Int. Cl.
*G01C 21/32* (2006.01)
*B60W 30/10* (2006.01)
(Continued)

(52) U.S. Cl.
CPC ............. *G01C 21/32* (2013.01); *B60W 30/10* (2013.01); *B60W 30/18145* (2013.01);
(Continued)

(58) Field of Classification Search
CPC ........ G01C 21/32; G01C 21/28; G01C 21/00; G01C 21/30; G01C 21/3407;
(Continued)

(56) References Cited

U.S. PATENT DOCUMENTS 5,416,477 A * 5/1995 Shibata .................. G01C 21/30
340/988
6,385,539 B1 * 5/2002 Wilson .................. G01C 21/30
701/468
(Continued)

FOREIGN PATENT DOCUMENTS

JP 2007-164339 A 6/2007
JP 2009-042225 A 2/2009
(Continued)

OTHER PUBLICATIONS

International Search Report with English translation and Written Opinion issued in corresponding application No. PCT/JP2016/080273 dated Nov. 8, 2016.
(Continued)

*Primary Examiner* — Hunter B Lonsberry
*Assistant Examiner* — Luis A Martinez Borrero
(74) *Attorney, Agent, or Firm* — Foley & Lardner LLP

(57) ABSTRACT

This vehicle control system (1) is configured from a vehicle control device (2) installed in a vehicle and a server (40) connected to the vehicle control device (2) via a network. The server (40) is equipped with: a virtual lane generation section which generates virtual lane information relating to a virtual lane virtually set on a road on the basis of at least the travelling locus of another vehicle other than the vehicle; and a server communication section (42) which transmits, to the vehicle control device, the virtual lane information generated by the virtual lane generation section. The vehicle control device (2) is equipped with: a vehicle communica-
(Continued)

tion section (14) which receives the virtual lane information from the server (40); a target course generation section (28) which generates a target course of the vehicle on the basis of the virtual lane information; a vehicle control section (39) which causes the vehicle to move along the target course generated by the target track generation section (28).

15 Claims, 27 Drawing Sheets

(51) Int. Cl.
    *B60W 30/18*     (2012.01)
    *B60W 40/072*     (2012.01)
    *G08G 1/16*     (2006.01)
    *B60W 50/00*     (2006.01)

(52) U.S. Cl.
    CPC .... *B60W 30/18154* (2013.01); *B60W 40/072* (2013.01); *B60W 2050/0088* (2013.01); *B60W 2050/0089* (2013.01); *B60W 2552/05* (2020.02); *B60W 2552/30* (2020.02); *G08G 1/166* (2013.01)

(58) Field of Classification Search
    CPC ... G01C 21/3415; B60W 30/09; B60W 30/10; B60W 30/16; B60W 30/12; B60W 50/14; B60W 30/06; B60W 10/20
    See application file for complete search history.

(56) References Cited

U.S. PATENT DOCUMENTS

| | | | | |
|---|---|---|---|---|
| 7,149,624 B2* | 12/2006 | Burzio | | G01S 13/825 701/408 |
| 8,073,617 B2* | 12/2011 | Nakamura | | G08G 1/20 701/450 |
| 8,392,104 B2* | 3/2013 | Nishira | | B60T 7/22 701/301 |
| 8,412,449 B2* | 4/2013 | Trepagnier | | G01S 17/86 701/301 |
| 8,626,427 B2* | 1/2014 | Park | | H04N 5/44504 701/119 |
| 8,655,543 B2* | 2/2014 | Tengler | | G01C 21/26 701/29.2 |
| 8,744,664 B2* | 6/2014 | Day | | G05D 1/0278 701/25 |
| 8,949,016 B1* | 2/2015 | Ferguson | | G05D 1/0274 701/301 |
| 8,954,217 B1* | 2/2015 | Montemerlo | | B60W 50/082 701/26 |
| 9,165,477 B2* | 10/2015 | Wilson | | G07C 5/008 |
| 9,240,124 B2* | 1/2016 | Hiruta | | G08G 1/0112 |
| 9,248,834 B1* | 2/2016 | Ferguson | | B60W 30/0956 |
| 9,279,691 B2* | 3/2016 | Kaehler | | G05D 1/0212 |
| 9,399,464 B2* | 7/2016 | Kunihiro | | B60W 30/10 |
| 9,437,053 B2* | 9/2016 | Jenkins | | G09B 29/106 |
| 9,528,834 B2* | 12/2016 | Breed | | G06T 7/73 |
| 9,544,736 B2* | 1/2017 | Yang | | H04W 4/029 |
| 9,721,471 B2* | 8/2017 | Chen | | G08G 1/0133 |
| 10,121,367 B2* | 11/2018 | Jammoussi | | G08G 1/0141 |
| 10,262,213 B2* | 4/2019 | Chen | | G01C 21/32 |
| 10,288,433 B2* | 5/2019 | Zheng | | G01C 21/30 |
| 10,386,846 B2* | 8/2019 | Matsuda | | B60W 30/10 |
| 10,444,020 B2* | 10/2019 | Dorum | | G01V 11/002 |
| 10,533,863 B2* | 1/2020 | Ma | | G08G 1/0129 |
| 10,546,400 B2* | 1/2020 | Dorum | | G06T 11/206 |
| 10,569,788 B2* | 2/2020 | Abe | | G07B 15/06 |
| 10,661,794 B2* | 5/2020 | Niino | | B60T 8/17 |
| 2002/0059017 A1* | 5/2002 | Yamane | | G08G 1/08 701/1 |
| 2004/0230375 A1* | 11/2004 | Matsumoto | | B60W 30/12 701/301 |
| 2005/0021195 A1* | 1/2005 | Zeitler | | G05D 1/024 701/23 |
| 2006/0082472 A1* | 4/2006 | Adachi | | G08G 1/096716 340/995.13 |
| 2008/0082261 A1* | 4/2008 | Tengler | | G08G 1/133 701/414 |
| 2008/0162041 A1* | 7/2008 | Nakamura | | G09B 29/10 701/533 |
| 2009/0005979 A1* | 1/2009 | Nakao | | G01C 21/30 701/414 |
| 2009/0271071 A1* | 10/2009 | Buerkel | | B62D 15/025 701/41 |
| 2010/0106356 A1* | 4/2010 | Trepagnier | | G08G 1/16 701/25 |
| 2010/0295668 A1* | 11/2010 | Kataoka | | B62D 15/025 340/435 |
| 2011/0276227 A1* | 11/2011 | Sugawara | | B60W 30/12 701/41 |
| 2012/0150379 A1* | 6/2012 | Day | | G05D 1/0278 701/25 |
| 2012/0226392 A1* | 9/2012 | Kataoka | | G08G 1/167 701/1 |
| 2013/0289875 A1* | 10/2013 | Kumon | | G01C 21/36 701/533 |
| 2014/0200801 A1* | 7/2014 | Tsuruta | | B60W 30/10 701/400 |
| 2015/0134204 A1* | 5/2015 | Kunihiro | | B60W 40/112 701/41 |
| 2016/0167582 A1* | 6/2016 | Chen | | G01C 21/32 348/148 |
| 2017/0069200 A1* | 3/2017 | Masutani | | H04L 67/42 |
| 2018/0201271 A1* | 7/2018 | Ishioka | | B60W 10/18 |
| 2018/0267542 A1* | 9/2018 | Lamon | | G05D 1/0272 |
| 2019/0118809 A1* | 4/2019 | Niino | | B60W 60/001 |
| 2019/0384293 A1* | 12/2019 | Yoo | | B60W 40/06 |

FOREIGN PATENT DOCUMENTS

| | | |
|---|---|---|
| JP | 2012-221291 A | 11/2012 |
| JP | 2014-136480 A | 7/2014 |
| JP | 2015-004814 A | 1/2015 |

OTHER PUBLICATIONS

Office Action issued in corresponding Japanese Patent Application No. 2017-545441 dated Aug. 13, 2019, with English machine translation.

* cited by examiner

VEHICLE CONTROL SYSTEM AND VEHICLE CONTROL DEVICE

TECHNICAL FIELD

The present invention relates to a vehicle control system and a vehicle control device.

BACKGROUND ART

PTL 1 discloses an invention for detecting a white line on a road and causing a vehicle to automatically travel along the white line.

CITATION LIST

Patent Literature

PTL 1: JP 2014-136480 A

SUMMARY OF INVENTION

Technical Problem

In the invention disclosed in PTL 1, it is not possible to acquire a target locus of traveling similar to those of other vehicles.

Solution to Problem

According to a first aspect of the present invention, in a vehicle control system including a vehicle control device mounted on a vehicle and a server connected to the vehicle control device via a network, the server includes a virtual lane generation section which generates virtual lane information relating to a virtual lane virtually set on a road at least based on traveling loci of other vehicles other than the vehicle, and a server communication section which transmits the virtual lane information generated by the virtual lane generation section to the vehicle control device, and the vehicle control device includes a vehicle communication section which receives the virtual lane information from the server, a target course generation section which generates a target course of the vehicle based on the virtual lane information, and a vehicle control section which causes the vehicle to move along the target course generated by the target course generation section.

According to a second aspect of the present invention, a vehicle control device mounted on a vehicle includes: a vehicle communication section which receives virtual lane information relating to a virtual lane virtually set on a road; a target course generation section which generates a target course of the vehicle based on the virtual lane information received by the vehicle communication section; and a vehicle control section which causes the vehicle to move along the target course generated by the target course generation section.

According to a third aspect of the present invention, a vehicle control device mounted on a vehicle includes: a storage section which stores virtual lane information relating to a virtual lane virtually set on a road at least based on traveling loci of other vehicles other than the vehicle; a target course generation section which generates a target course of the vehicle based on the virtual lane information stored in the storage section; and a vehicle control section which causes the vehicle to move along the target course generated by the target course generation section.

Advantageous Effects of Invention

According to the present invention, it is possible to acquire a target locus similar to that of other vehicles.

BRIEF DESCRIPTION OF DRAWINGS

FIG. 2 is a diagram showing a data structure of map information 13a.

FIG. 3 is a diagram showing the data structure of the map information 13a.

DESCRIPTION OF EMBODIMENTS

First Embodiment

Hereinafter, a first embodiment of a vehicle control system and a vehicle control device will be described with reference to FIGS. 1 to 14.

Figure 1:
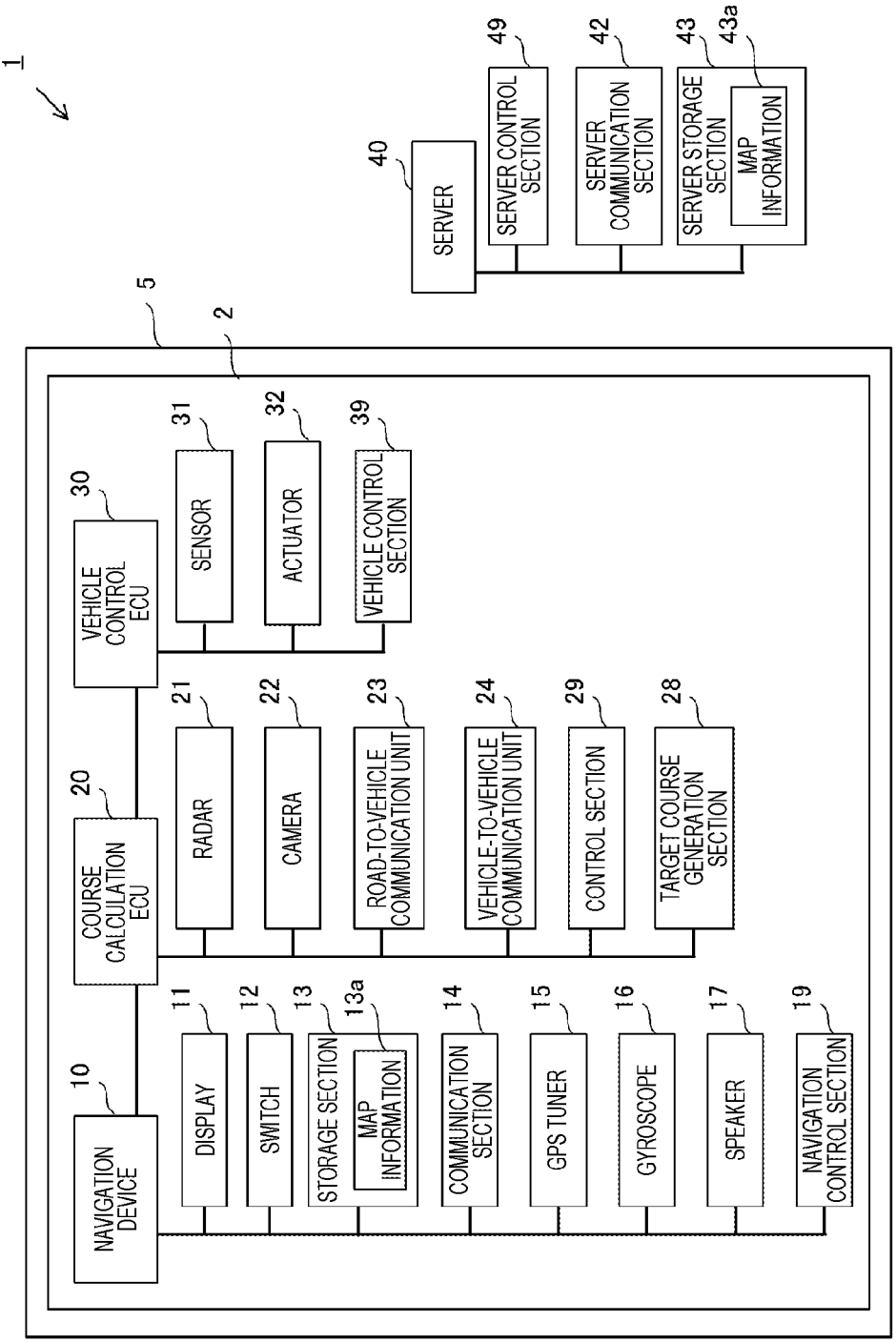
FIG. 1 is a block diagram showing a configuration of a vehicle control system 1.

FIG. 1 is a block diagram showing a configuration of a vehicle control system 1. The vehicle control system 1 includes a vehicle control device 2 and a server 40. The vehicle control device 2 is mounted on a vehicle 5. The vehicle control device 2 and the server 40 are connected to each other via a network. The server 40 is connected to a plurality of vehicle control devices 2, but in FIG. 1, only one vehicle control device 2 is illustrated. All vehicle control devices 2 are mounted on a vehicle.

The vehicle control device 2 includes a navigation device 10, a course calculation ECU 20, and a vehicle control ECU 30.

The navigation device 10 includes a display 11 which presents information to a user, a switch 12 which receives an input from the user, a storage section 13 which stores information used for processing to be described below, a vehicle communication section 14 which performs communication with a server 40, a GPS tuner 15 which calculates a position, a gyroscope 16 which calculates an attitude, a speaker 17 which presents information to the user, a route calculation section 18 which calculates a route to an input destination, and a navigation control section 19.

The switch 12 includes a plurality of buttons, and a driver uses the switch 12 to set the destination or to set presence or absence of an automatic operation request.

The storage section 13 is a nonvolatile memory or a magnetic disk, and the storage section 13 stores map information 13a. A data structure of the map information 13a is described below. This map information 13a includes not only information on a traveling lane which is defined by a mark line drawn on a road, but also information (hereinafter, referred to as "virtual lane information") on a traveling lane which is virtually set on a road on which the mark line is not drawn. Hereinafter, the virtual traveling lane specified by the virtual lane information is referred to as a "virtual lane" and a lane specified by a lane mark line drawn on a road is referred to as a "real lane". The map information 13a is used to grasp a position of an own vehicle, grasp positions of other vehicles, calculate a traveling route, or the like.

The vehicle communication section 14 receives new map information from the server 40 and updates the map information 13a of the storage section 13.

The GPS tuner 15 demodulates a signal received by a GPS antenna (not shown) from a GPS satellite to calculate the position of the vehicle control device 2. A plurality of positions calculated by the GPS tuner 15 are put together, which is a locus (hereinafter, referred to as "traveling locus") along which the vehicle 5 on which the vehicle control device 2 is mounted has traveled.

The route calculation section 18 calculates the route to the input destination using the map information 13a stored in the storage section 13.

The navigation control section 19 includes a CPU, a ROM, and a RAM which are not shown, and develops a program, which is stored in the ROM, in the RAM and executes the program. The operation of this program is described below. In addition to the operation of the program described below, the navigation control section 19 transmits the traveling locus of the vehicle to the server 40 every predetermined time.

The course calculation ECU 20 includes a radar 21 and a camera 22 which monitor circumference, a road-to-vehicle communication unit 23 and a vehicle-to-vehicle communication unit 24 which grasp positions of other vehicles by communication, and a target course generation section 28 which calculates a course (hereinafter, referred to as "target course") which is a traveling target of a vehicle, and a control section 29.

The target course generation section 28 includes a CPU, a ROM, and a RAM which are not shown, and develops a program, which is stored in the ROM, in the RAM and executes the program, thereby calculating the target course. When calculating the target course, the target course generation section 28 refers to the position of the vehicle control device 2 calculated by the navigation device 10 and the map information 13a stored in the navigation device 10. The operation of this program is described below. The target course generation section 28 corrects the target course to avoid obstacles as needed, based on information obtained from the radar 21 and the camera 22 and the positions of other vehicles obtained by the road-to-vehicle communication and the vehicle-to-vehicle communication.

The control section 29 includes a CPU, a ROM, and a RAM which are not shown, and develops a program, which is stored in the ROM, in the RAM and executes the program. The operation of this program is described below.

The vehicle control ECU 30 includes a sensor 31 such as a steering angle sensor and a vehicle speed sensor, an actuator 32 controlling a steering, an accelerator, and a brake, and a vehicle control section 39.

The vehicle control section 39 includes a CPU, a ROM, and a RAM which are not shown, and develops a program, which is stored in the ROM, in the RAM and executes the program. This program outputs an operation command to the actuator 32 so that the vehicle 5 moves along the target course calculated by the course calculation ECU 20.

The server 40 includes a server communication section 42 which communicates with the navigation device 10, a server storage section 43, and a server control section 49.

The server storage section 43 is a nonvolatile memory or a magnetic disk, and the server storage section 43 stores map information 43a. A data structure of the map information 43a is similar to that of the map information 13a. The map information 43a is transmitted to the navigation device 10 via the server communication section 42, and the map information 13a of the storage section 13 is updated.

The server control section 49 includes a CPU, a ROM, and a RAM which are not shown, and develops a program, which is stored in the ROM, in the RAM and executes the program. The program generates virtual lane information based on the traveling locus received from the plurality of vehicle control devices 2 and updates the map information 43a. It should be noted that the map information 43a may be rewritten from the outside via the server communication section 42.

<Map Information>

The data structure of the map information 13a is described. As described above, the map information 43a also has the same data structure.

Figure 2:
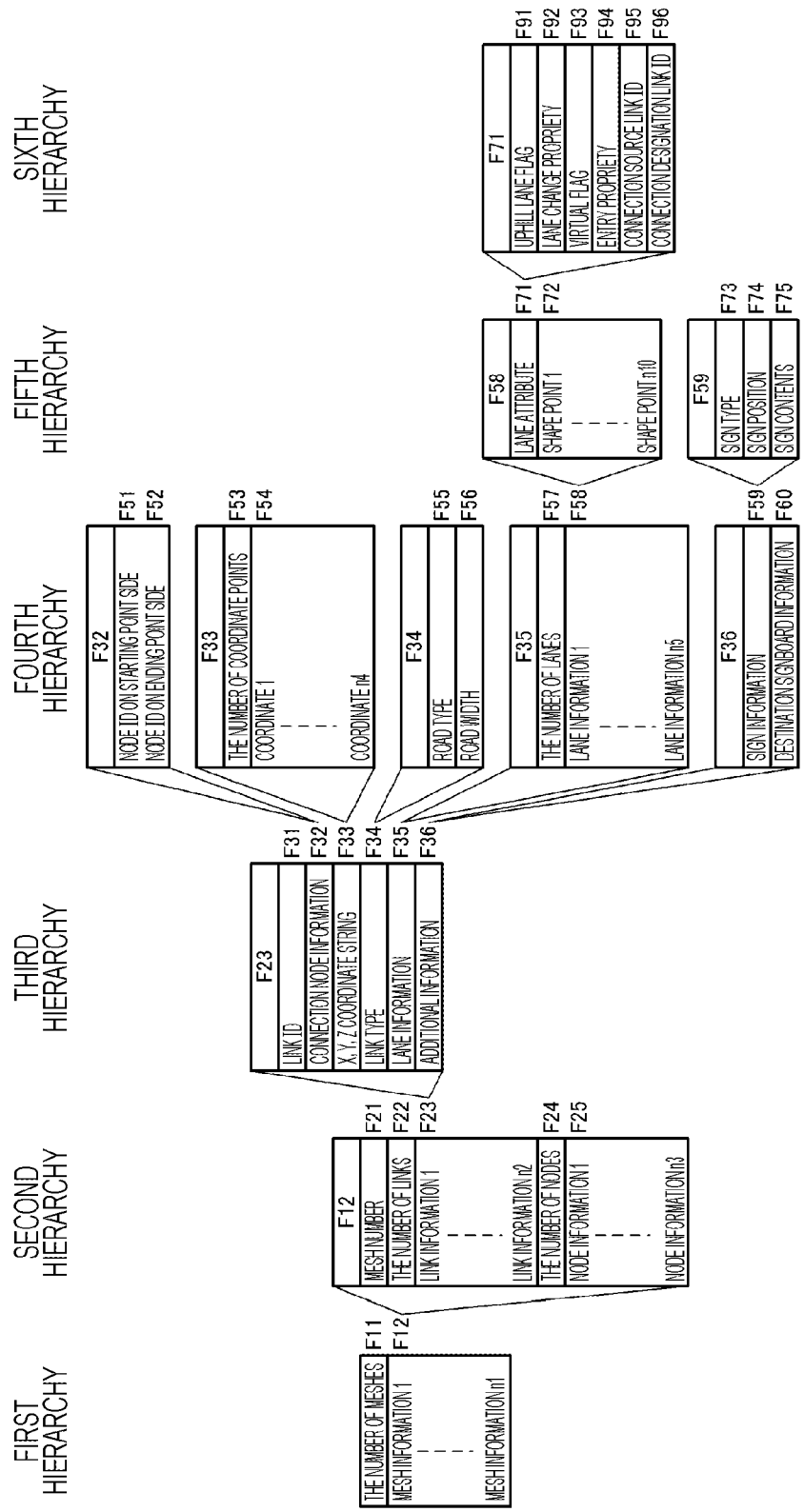
Figure 3:
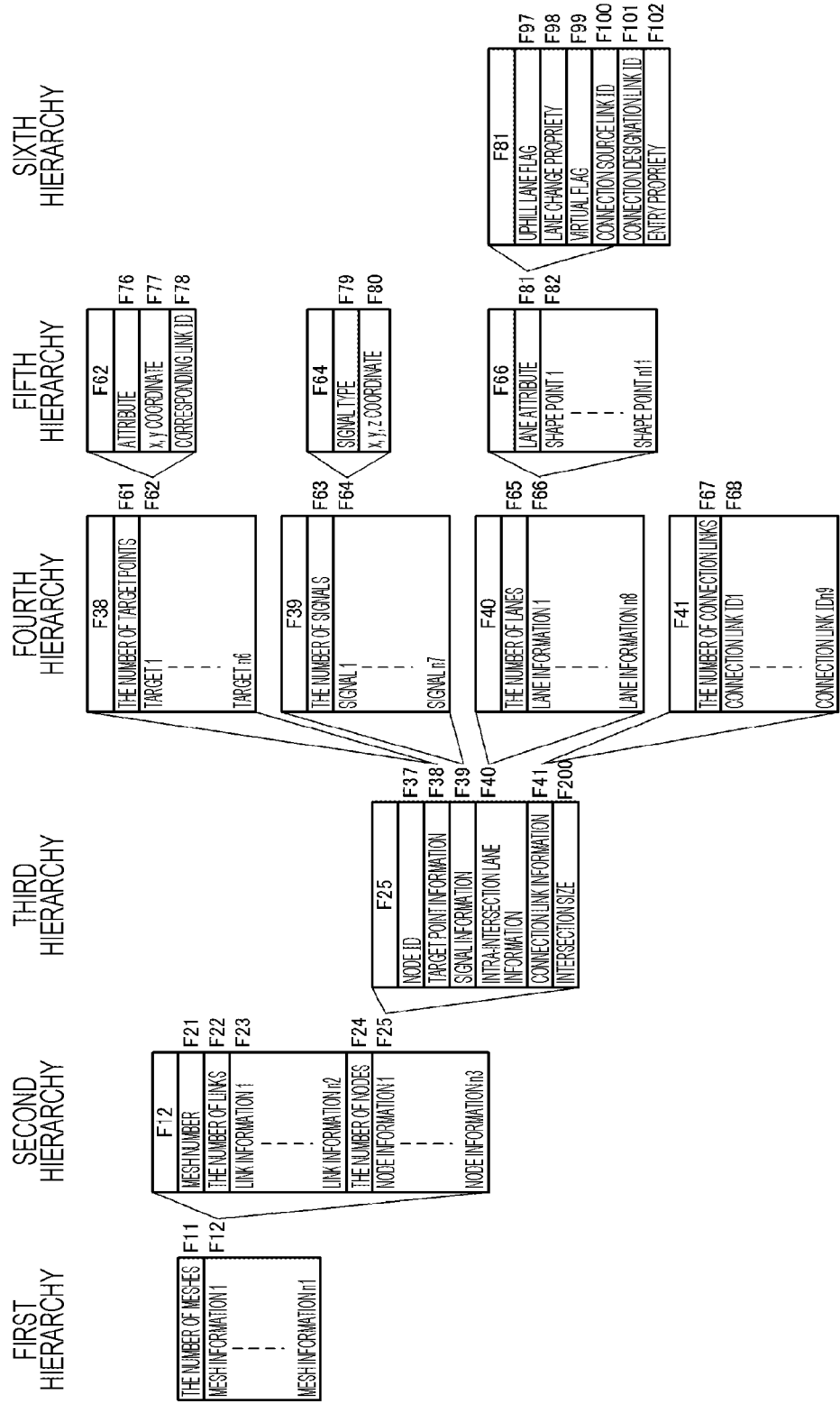

FIGS. 2 and 3 are diagrams showing the data structure of the map information 13a. The map information 13a includes six hierarchies of first to sixth hierarchies, and elements of a certain hierarchy include elements of a plurality of lower hierarchies. In FIGS. 2 and 3, a left end shown is a first hierarchy and a right end shown is a sixth hierarchy. In FIGS. 2 and 3, a sign consisting of "F" and numerals are attached to the respective elements. In FIGS. 2 and 3, hierarchies under a third hierarchy are different. FIG. 2 shows a structure under link information F23 and FIG. 3 shows a structure under node information F25. First, a range shown in FIG. 2 is described.

The map information 13*a* is managed by being divided into a grid-like area called a mesh. The mesh is generally separated by constant values of latitude and longitude. Each mesh size may be stored as a fixed length or a data size may be stored as variable length. Here, each mesh size is stored as the fixed length and the data size is not stored. When the mesh size is stored as a variable length according to the data size of each mesh, there is a need to store a capacity of each data in the map data. The same goes for the following each data.

The number of meshes stored in the map information 13*a* is stored as the number of meshes F11, information on each mesh is stored in mesh information F12, and the same number of mesh information F12 as the meshes is stored as mesh information 1, mesh information 2, . . . .

A configuration of the second hierarchy is described.

The mesh information F12 includes a mesh number F21, the number of links F22, a plurality of pieces of link information F23, the number of nodes F24, and a plurality of pieces of node information F25.

The mesh number F21 stores a number which identifies the mesh. The number of links F22 stores the number of links included in the mesh. The link is described below. The individual information on these links is stored in link information F23, and the same number of link information F23 as the link are stored as link information 1, link information 2, . . . . The number of nodes F24 stores the number of nodes included in the mesh. The node is described below. The individual information on these nodes is stored in the node information F25. A structure of the node information F25 is described below with reference to FIG. 3.

Figure 4:
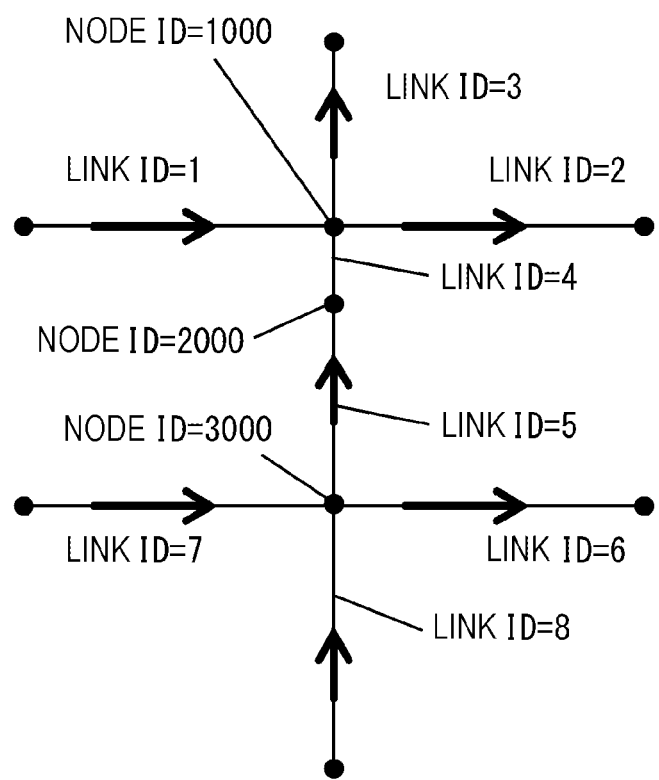
FIG. 4 is a diagram explaining a node and a link.

The node and the link are described with reference to FIG. 4. The node refers to certain points on a road and the link connects the nodes to each other. The nodes are mainly set at an intersection, but the node is also provided at a boundary at which the link information such as increase and decrease in the number of lanes is changed. As shown in FIG. 4, the link information is information relating to a road indicated by a line segment in FIG. 4, and the node information is information relating to an intersection indicated by a black circle point in FIG. 4. The description is continued with reference to FIG. 2 again.

A configuration of the third hierarchy is described.

The link information F23 includes a link ID F31 in which a unique number is stored, connection node information F32 in which information relating to the node connected to the link is stored, an XYZ coordinate string F33 in which a coordinate of interpolation points for indicating starting and ending points and a road shape therebetween, a link type F34 in which a classification of roads such as highway or a national road is stored, lane information F35 in which the number of lanes or a type of lane mark line are stored, and additional information F36 in which a position of a traffic sign and the like are stored.

A configuration of the fourth hierarchy is described.

The connection node information F32 includes a node ID (F51) on a starting point side as seen from a direction in which a vehicle can advance and a node ID (F52) on an ending point side as seen from the direction in which the vehicle can advance. In the example shown in FIG. 4, if the link is link ID=4, a node ID on the starting point side is equal to 2000 and a node ID on the ending point side is equal to 1000.

The XYZ coordinate string F33 stores the information relating to the coordinates for indicating the starting and ending points of the link and the road shape therebetween, and includes the number of coordinate points F53 in which the points of the coordinate points are stored and a plurality of coordinates F54 in which specific XYZ coordinates, that is, longitude, latitude, and altitude from a reference point are stored.

The link type F34 includes a road type F55 representing the classification of roads such as highways or a national roads and a road width F56. However, apart from this, the classification may include a ramp road indicating an entrance or an exit of highway and a roundabout indicating a rotary-like road.

The lane information F35 includes the number of lanes F57 and a plurality of lane information F58 in which the information on the lane is stored.

The additional information F36 includes sign information F59 in which information relating to a sign is stored and destination signboard information F60 in which information relating to a destination signboard having information equivalent to the sign is stored.

A configuration of the fifth hierarchy is described.

The lane information F58 includes a lane attribute F71 in which information indicating a lane attribute is stored and a plurality of shape points F72 in which coordinates indicating a shape of a central line of a lane are stored.

The sign information F59 includes a sign type F73 in which a classification of a no stopping/parking area, a speed sign or the like is stored, a sign position F74 in which a position of a sign is stored, and sign contents F75 in which contents described in a sign are stored.

A configuration of the sixth hierarchy is described.

The lane attribute F71 includes an uphill lane flag F91 in which information on whether a lane is an uphill lane is stored, a lane change propriety F92 in which information on whether a lane can be changed to left and right lanes is stored, a virtual flag F93 in which information on whether a lane is a real lane or a virtual lane is stored, an entry propriety F94 in which information on whether a passenger car can be traveled is stored, a connection source link ID (F95) which is a rear side link as viewed from an advancing direction among the links to which the lane is connected, and a connection destination link ID (F96) which is a front side link as viewed from the advancing direction among the links connected to the which the lane is connected.

The structure of the node information F25 belonging to the third hierarchy is described with reference to FIG. 3.

The node information F25 includes a node ID F37 which is a unique number, target point information F38 in which information on a target point used as a target position at the time of a course generation when there is no virtual lane is stored, signal information F39 in which information on a traffic light existing within the intersection is stored, intra-intersection lane information F40 in which lane information within the intersection is stored, connection link information F41 in which information on a link connected to the node is stored, and an intersection size F200 indicating a size of a radius of the intersection.

The configuration of the fourth hierarchy in FIG. 3 is described.

The target point information F38 is information used when the virtual lane is not set and a course is generated toward the coordinates indicated by this information. The target point information F38 includes the number of target points F61 in which a total number of target points are stored, and a plurality of targets F62 in which information on the target point is stored.

The signal information F39 includes the number of signals F63 in which the total number of signals is stored and a plurality of signals F64 in which information relating to the signals is stored.

The configuration of the intra-intersection lane information F40 is similar to that of the lane information F35. That is, a structure of lane information F66 configuring the intra-intersection lane information F40 is the same as that of the lane information F58, and a configuration of a lane attribute F81 is the same as that of the lane attribute F71.

The connection link information F41 includes the number of connection links F67 in which the total number of links connected to the node is stored and a plurality of connection link IDs (F78) in which the link ID of the link to be connected is stored. In the example shown in FIG. 4, since four links are connected to a node having node ID=1000, the number of connection links F67 stores "4" and the connection link ID (F68) stores ID=1, 2, 3, and 4. The description is continued with reference back to FIG. 3 again.

The configuration of the fifth hierarchy in FIG. 3 is described.

The target F62 includes an attribute F76 in which information indicating what lane of the lanes is stored, an XY coordinate F77 in which latitude and longitude are stored, a corresponding link ID F78 in which a link ID corresponding to the target point is stored.

The signal F64 includes a signal type F79 in which information relating to the type of the signal such as whether it is a suspension type or installed in a pole is stored and a coordinate F80 in which information relating to the latitude, longitude and altitude of the signal is stored.

The configuration of the lane information F66 is the same as that of the lane information F58 as described above.

As described above, the virtual lane information is indicated in the map information 13a by the lane information F58 of the lane information F35, in which a virtual flag F93 indicates a virtual lane, and the lane information F66 of the intra-intersection lane information F40, in which a lower flag F99 indicates the virtual lane.

(Flow Chart)

The operation of the vehicle control device 2 is described with reference to FIGS. 5 to 10.

Figure 5:
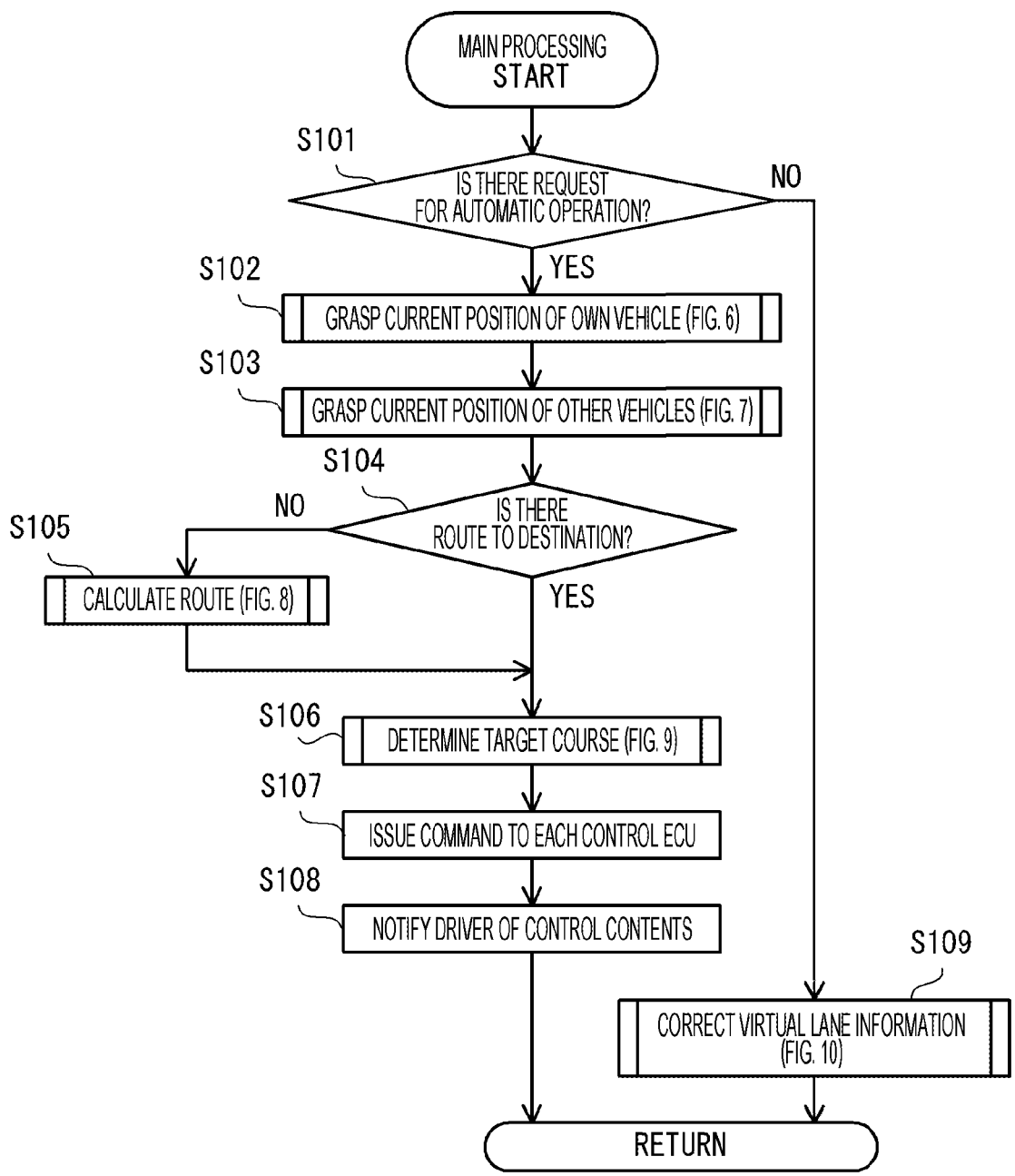
FIG. 5 is a flow chart illustrating an operation of main processing.

FIG. 5 is a flow chart showing an operation of main processing executed by the control section 29 of the course calculation ECU 20. An execution entity of each step described below is the CPU of the control section 29. The present processing starts once, for example, every 50 ms.

In step S101, it is determined whether there is a request for an automatic operation by an operation of the switch 12 by a driver. If it is determined that there is the request for the automatic operation, the process proceeds to step S102, and if it is determined that there is no request for the automatic operation, the process proceeds to step S109.

Figure 6:
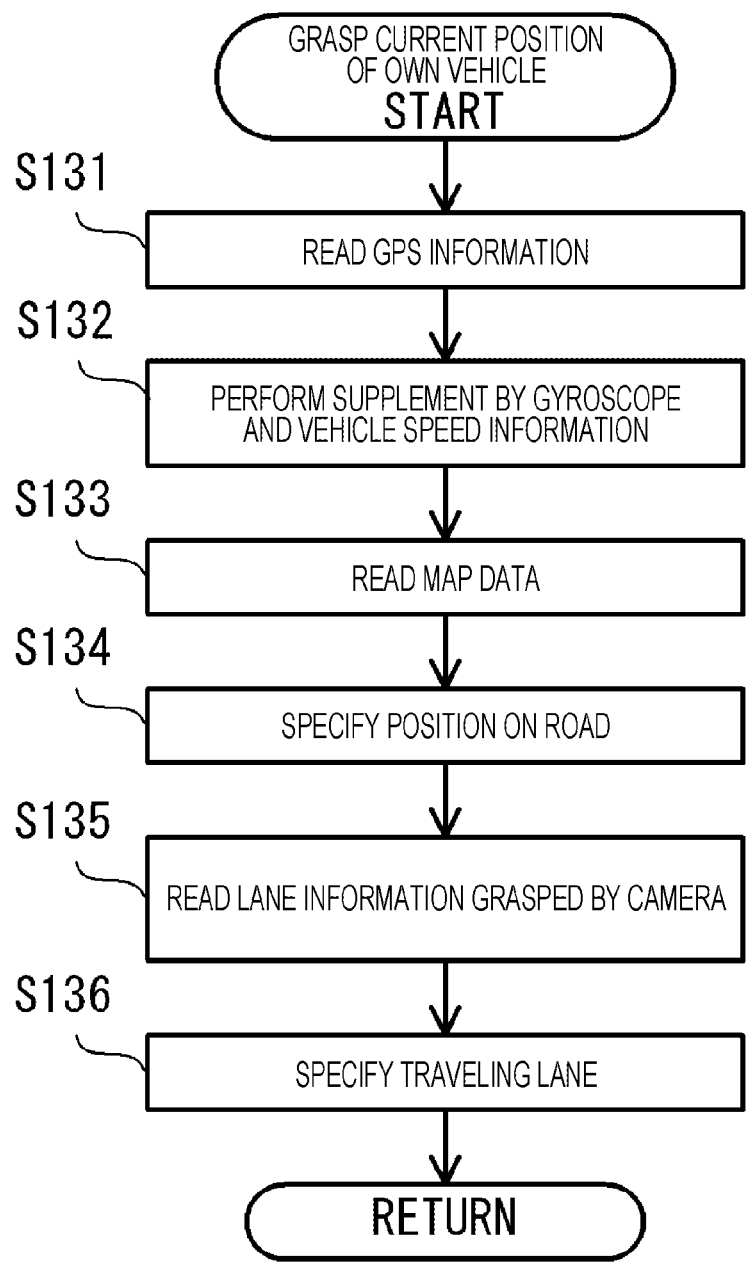
FIG. 6 is a flow chart showing a processing operation of grasping a current position of an own vehicle.

In step S102, the navigation device 10 performs the processing of grasping the current position of the own vehicle shown in detail in FIG. 6, and if a processing result is received, the process proceeds to step S103.

Figure 7:
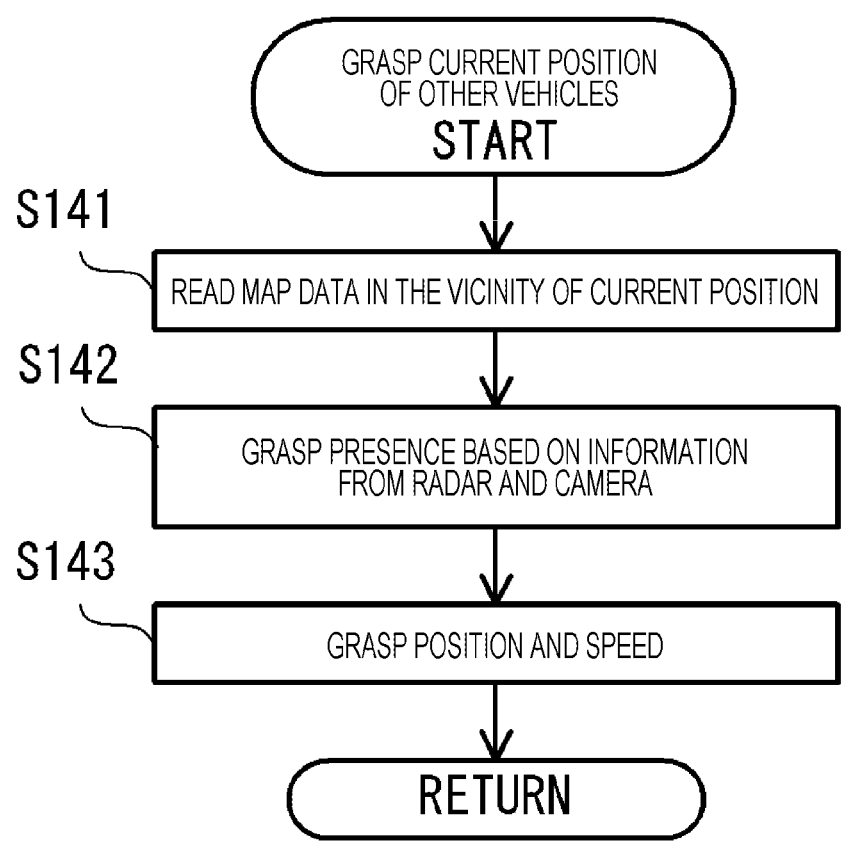
FIG. 7 is a flow chart showing a processing operation of grasping current positions of other vehicles.

In step S103, the processing of grasping the current positions of other vehicles shown in detail in FIG. 7 is performed, and then the process proceeds to step S104.

In step S104, it is determined whether the route to the destination is set, and if it is determined that the route to the destination is set, the process proceeds to step S105 and if it is determined that the route to the destination is not set, the process proceeds to step S106.

Figure 8:
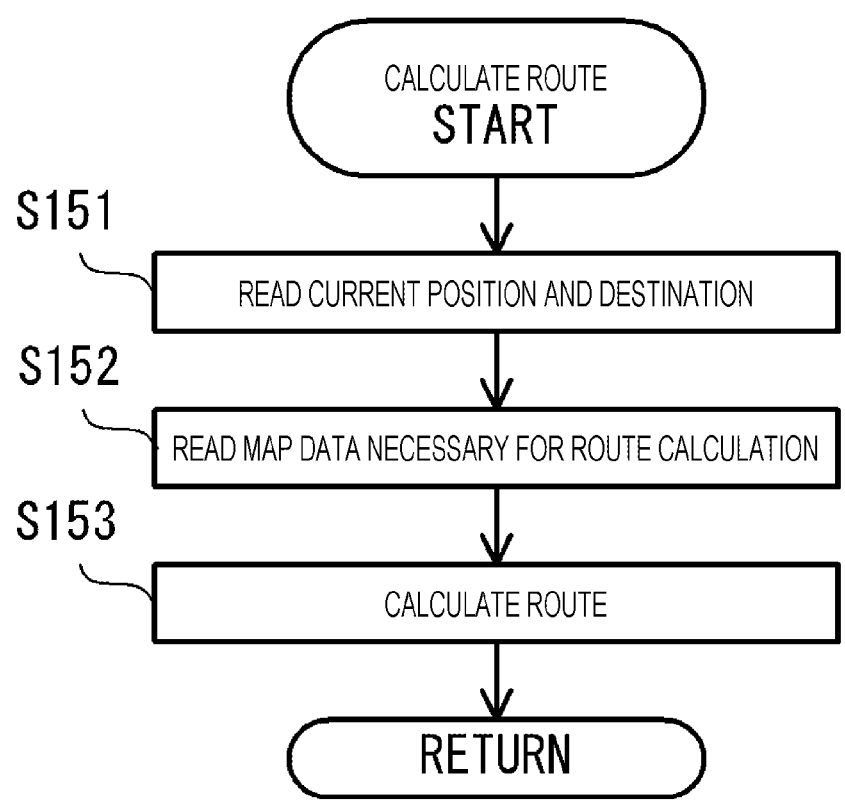
FIG. 8 is a flow chart showing a processing operation of route calculation.

In step S105, the navigation device 10 performs the route calculation shown in detail in FIG. 8, and if the processing result is received, the process proceeds to step S106.

Figure 9:
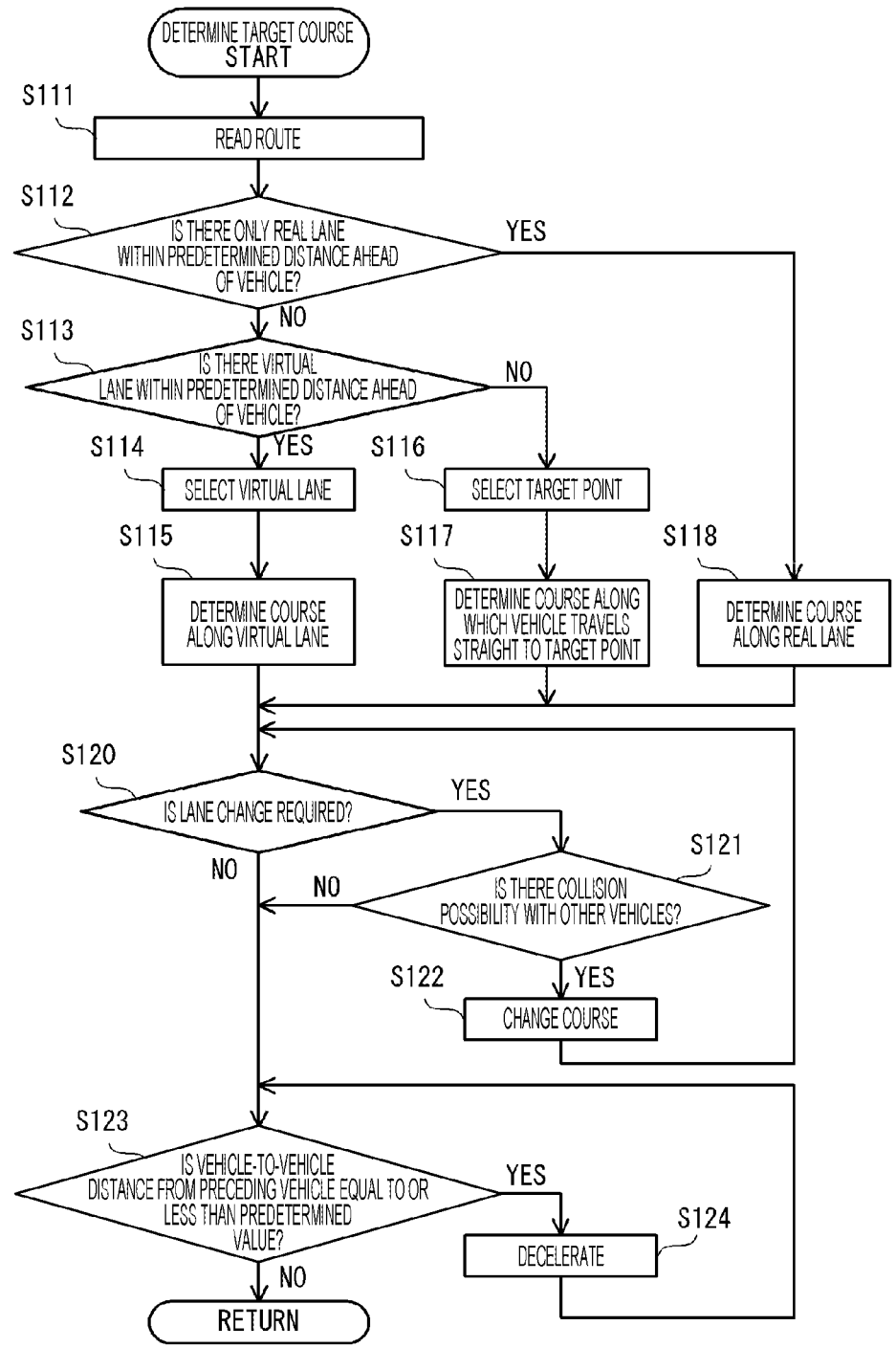
FIG. 9 is a flow chart showing processing of determining a target locus.

In step S106, the processing of determining the target course shown in detail in FIG. 9 is performed, and then the process proceeds to step S107.

In step S107, an operation command is output to the vehicle control ECU 30 so that the vehicle travels along the target course determined in step S106, and the process proceeds to step S108.

In step S108, behavior of the vehicle is notified to the driver using the display 11 or the speaker 17 in order to give a sense of security to the driver, and the operation of the program shown in FIG. 5 ends.

Figure 10:
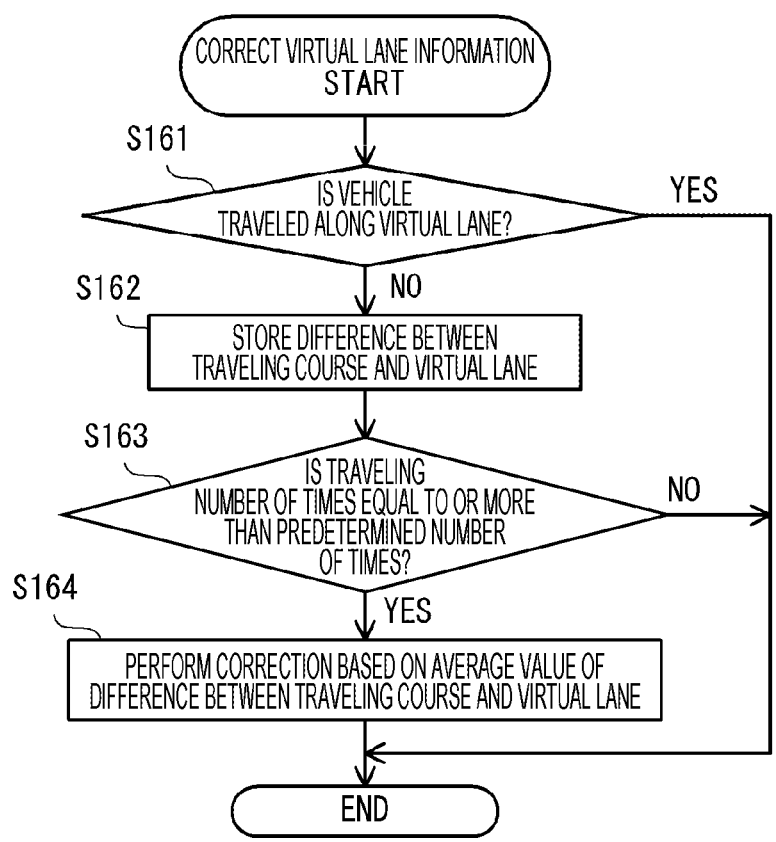
FIG. 10 is a flow chart showing a processing operation of a virtual map correction.

In step S109 executed when the negative determination is made in step S101, virtual lane correction processing shown in detail in FIG. 10 is performed, and the operation of the program shown in FIG. 5 ends.

FIG. 6 is a flow chart showing the processing operation of grasping the current position of the own vehicle executed by the navigation device 10 based on the operation command from the course calculation ECU 20. An execution entity of each step described below is the CPU of the navigation control section 19.

In step S131, the current position or azimuth information of the vehicle is read from the GPS tuner 15, and the process proceeds to step S132.

In step S132, the current position read in step S131 is supplemented based on the information on the gyroscope 16 and the vehicle speed sensor which is the sensor 31 connected to the vehicle control ECU 30. In addition, when the current position or the azimuth information of the vehicle is not read in step S131, the latitude, longitude and azimuth of the own vehicle are calculated based on an angular velocity in a yaw direction of the vehicle obtained from the gyroscope 16 or a travel distance and an azimuth change amount obtained from the vehicle speed sensor. Next, the process proceeds to step S133.

In step S133, the information on the road in the vicinity of the position of the own vehicle within the map data is read out. In the following step S134, the position on the road is specified most reliably based on the current position and the azimuth among the roads which are read out, and a link number of the road is stored. Next, the process proceeds to step S135.

In step S135, an image photographed by the camera 22 is processed, and a result of recognizing whether the mark line on both sides of the lane on which the own vehicle is traveling is a solid line or a broken line is obtained via the course calculation ECU 20. In the following step S136, the information on the current position, the azimuth, and the mark line is compared with the map information 13a to specify the lane on which the vehicle is traveling and transmit the specified lane to the course calculation ECU 20. However, when the discrimination is not made only by the image recognition result of the lane on which the own vehicle is traveling, the lane may be specified by using the information on the mark line existing around the neighboring lanes or the like.

In this way, the operations in the flow chart shown in FIG. 6 ends.

FIG. 7 is a flow chart showing the processing operation of grasping the current positions of other vehicles described with reference to FIG. 5. The execution entity of each step described below is the CPU of the control section 29.

In step S141, the map data in the vicinity of the current position included in the map information 13a is read out from the navigation device 10, and the process proceeds to step S142.

In step S142, the distance and angle with respect to other vehicles are calculated based on the information obtained from the radar 21, and the distance and angle with respect to other vehicles are calculated by analyzing a photographed image obtained from the camera 22. Consistency between the information obtained from the radar 21 and the information obtained from the camera 22 is confirmed, and a relative position with respect to other vehicles existing around the own vehicle is grasped. Next, the process proceeds to step S143.

In step S143, it is grasped on which lane other vehicles are traveling based on the information obtained in step S143 and the shape of the lane included in the map information 13a. In addition, a speed of other vehicles is also obtained using the Doppler effect of the radar 21. However, after it is determined whether it is the same as the one previously recognized by using the image photographed by the camera 22, if it is the same, relative speeds of other vehicles may be obtained based on an elapsed time and a distance difference.

In this way, the operations in a subroutine shown in FIG. 7 ends.

FIG. 8 is a flow chart showing the processing operation of the route calculation executed by the navigation device 10 based on the operation command from the course calculation ECU 20. The execution entity of each step described below is the CPU of the navigation control section 19.

In step S151, the current position is read from the GPS tuner 15, and the destination that the driver sets using the switch 12 is read. In the following step S152, the map information 13a necessary for the route calculation is read, and the process proceeds to step S153.

In step S153, the route from the current position read in step S151 to the destination set by the driver, that is, the selection and permutation of the link is calculated. In this calculation of the route, the route where the distance from the current position to the destination is shortest or the required time is least is calculated using an algorithm which calculates an optimum route for a network such as the Dijkstra method. The calculation results are obtained as ones arranged in the traveling order of the links to be continued from the current position to the destination. The calculated route is transmitted to the course calculation ECU 20. The course calculation ECU 20 stores the received route information in the RAM of the control section 29.

In this way, the operation of the program shown in FIG. 7 ends.

FIG. 9 is a flow chart showing details of step S106 of FIG. 5. By the processing in this flow chart, the target locus along which the vehicle travels is determined.

In step S111, the route is read out from the RAM. The route stored in the RAM is shown in, for example, FIG. 11.

Figure 11:
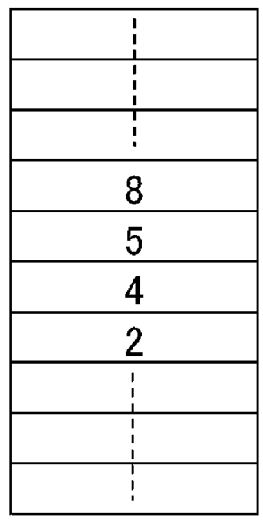
FIG. 11 is a diagram showing an example of a calculation result of a route.

FIG. 11 is a diagram showing an example of the calculation result of the route. As described above, the routes are arranged in the traveling order of the link IDs of the traveling links. Next, the process proceeds to step S112.

In step S112, the image photographed by the camera 22 is analyzed and it is determined whether only a real lane exists on a forward road within the predetermined distance from the current traveling place. If it is determined that the real lane exists and the virtual lane does not exist, the process proceeds to step S118, and if it is determined that at least the virtual lane exists or neither the real lane nor the virtual lane exists, the process proceeds to step S113. It should be noted that the determination in step S112 may be made based on the link information and the node information corresponding to the route ahead of the current position of the own vehicle specified by the navigation device 10 in step S102 among the map information 13a without using the analysis result of the image photographed by the camera 22.

In step S113, it is determined whether the virtual lane exists on the forward road within the predetermined distance from the current traveling place based on the link information and the node information corresponding to the route ahead of the current position of the own vehicle specified by the navigation device 10 in step S102. If it is determined that the virtual lane exists, the process proceeds to step S114, and if it is determined that the virtual lane does not exist, the process proceeds to step S116.

In step S114, the virtual lane is appropriately selected with reference to the route information, and in the following step S115, the target course along the virtual lane is determined. Next, the process proceeds to step S120.

In step S116 executed when it is determined that there is no virtual lane, the target point which is the starting point of the next traveling link is selected, and in the following step S117, the target course along which the vehicle goes straight from the current position toward the target point is determined. Next, the process proceeds to step S120.

In S118 executed when it is determined that there is the real lane and there is no virtual lane, the target course along the real lane is determined, and the process proceeds to step S120.

In step S120, it is determined whether the target starting determined in step S115, S117 or S118 is the target course requiring the lane change immediately, and if it is determined that the lane change is required, the process proceeds to step S121 and if it is determined that the lane change is not required, the process proceeds to step S123.

In step S121, it is determined whether there is a collision possibility of the own vehicle with other vehicles when the own vehicle performs the lane change according to the target course, based on the position and speed of the own vehicle obtained in step S102 of FIG. 5 and the positions and speeds of other vehicles obtained in step S103. If the collision possibility is equal to or more than a predetermined value, the process proceeds to step S122, and if the collision possibility is less than the predetermined value, the process proceeds to step S123.

In step S122, the change to the target course without the lane change is performed, or the change to the target course such as the lane change after a vehicle travels a predetermined distance, and the process returns to step S120.

In step S123, it is determined whether a distance from other vehicles existing ahead of the vehicle to the own vehicle is equal to or less than a predetermined value. If it is determined that the distance is larger than the predetermined value, the operation of the program shown in FIG. 9 ends, and if it is determined that the distance is smaller than the predetermined value, the process proceeds to step S124. However, in this step, the relative speed between other vehicles and the own vehicle in addition to the distance from other vehicles to the own vehicle may be considered.

In step S124, a deceleration command is output to the vehicle control ECU 30 to perform a deceleration, and the process returns to step S123.

FIG. 10 is a flow chart showing step S109 in FIG. 5 in detail. The map information 13a is updated by the processing in this flow chart. As described above, this step is executed when there is no request for an automatic operation, that is, when the driver himself/herself drives a vehicle.

In step S161, it is determined whether the traveling locus along which the driver himself/herself drives a vehicle follows the virtual lane. If it is determined that the traveling locus follows the virtual lane, since it is not necessary to correct the map information 13a, the operation of the program shown in FIG. 10 ends. If it is determined that the traveling locus does not follow the virtual lane, the process proceeds to step S162.

In step S162, the difference between the traveling locus and the virtual lane is recorded, and the process proceeds to step S163.

In step S163, it is determined whether the number of times that the vehicle does not travel along the virtual lane at that location is equal to or more than a predetermined number of times. If it is determined that the number of times is equal to or more than the predetermined number of times, the process proceeds to step S164, and if it is determined that the number of times is less than the predetermined number of times, the operation of the program instructing the execution of the operations shown in FIG. 10 ends.

In step S164, the average value of the difference between the traveling locus and the virtual lane is calculated, the virtual lane corrected based on the average value is recorded in the map information 13a as a new virtual lane, that is, the map information 13a is updated. However, the average value of the traveling locus may be considered as a new virtual lane. In this way, the operation of the program instructing the execution of the operations shown in FIG. 10 ends.

Operation Example 1

The processing shown in steps S112 to S118 of FIG. 9 is described with reference to FIGS. 2 to 4 and FIG. 11. As a premise of the situation described below, the calculation result of the route shown in FIG. 11 is stored in an RAM, the map information 13a corresponding to circumference of the vehicle 5 on which the vehicle control device 2 is mounted is shown in FIG. 4, and the vehicle 5 is assumed to be on the current link having link ID=4.

First, the link information F23 having the link number is read out from the map information 13a, and the node ID on the ending point side within the link information is obtained. In the example shown in FIG. 4, the node ID on the ending point side is 1000. It should be noted that this processing corresponds to a process of searching for a next intersection that a vehicle travels. The information on the node ID is obtained from the node information F25, and it is determined whether there is the target F62 or the lane information F66 in which the virtual flag F93 is ON (step S112). If there is not such lane information F66, the target course along the real lane is determined (step S118).

If there is the link having link ID=2 which is the next link on the route among the links in which a virtual link flag F95 is ON (step S113), the virtual lane is selected.

If there is no link having link ID=2 which is the next link on the route in step S113, the target point of the link ID=2 which is the next link on the route from the target point information F38 within the node information is selected (step S116) and the target course along which the vehicle goes straight to the coordinates of that point is generated (step S117). It should be noted that the coordinates of the node on the starting point side of the next link on the route may be used instead of the target point.

Operation Example 2

Figure 12:
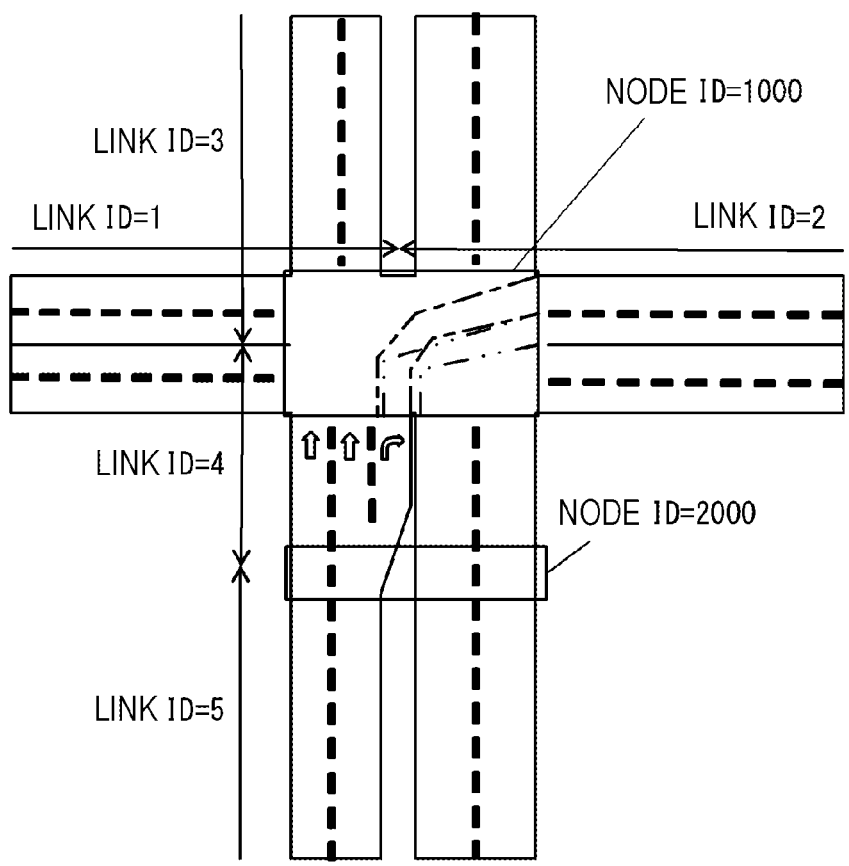
FIG. 12 is a diagram showing an example in which a plurality of virtual lanes are present.

FIG. 12 is a diagram showing an example in which a plurality of virtual lanes exist. In FIG. 12, four links having link IDs=1 to 4 are connected to a node having node ID=1000, and link ID=4 is connected to a link having link ID=5 at a node having node ID=2000. However, the node having node ID=1000 is indicated by the size indicating the intersection based on the intersection size F200 stored in the map information 13a. In addition, as shown in FIG. 12, in the map information 13a, the link having link ID=2 is configured from two lanes, and as the virtual lane connected from the link having link ID=4 to the link having link ID=2, a total of two virtual lanes connected to the respective lanes are recorded.

When the link having link ID=2 is set next to the link having link ID=4 in the calculated route, the target course generation section 28 selects the virtual lane as follows, for example (FIG. 9, step S114). In other words, in the case in which a route at which a vehicle turns right after the vehicle has traveled on the link having link ID=2 is set, a virtual lane connected to a lane below FIG. 12 is selected, and in other cases, the virtual lane connected to the lane above FIG. 12 is selected.

Operation Example 3

Figure 13:
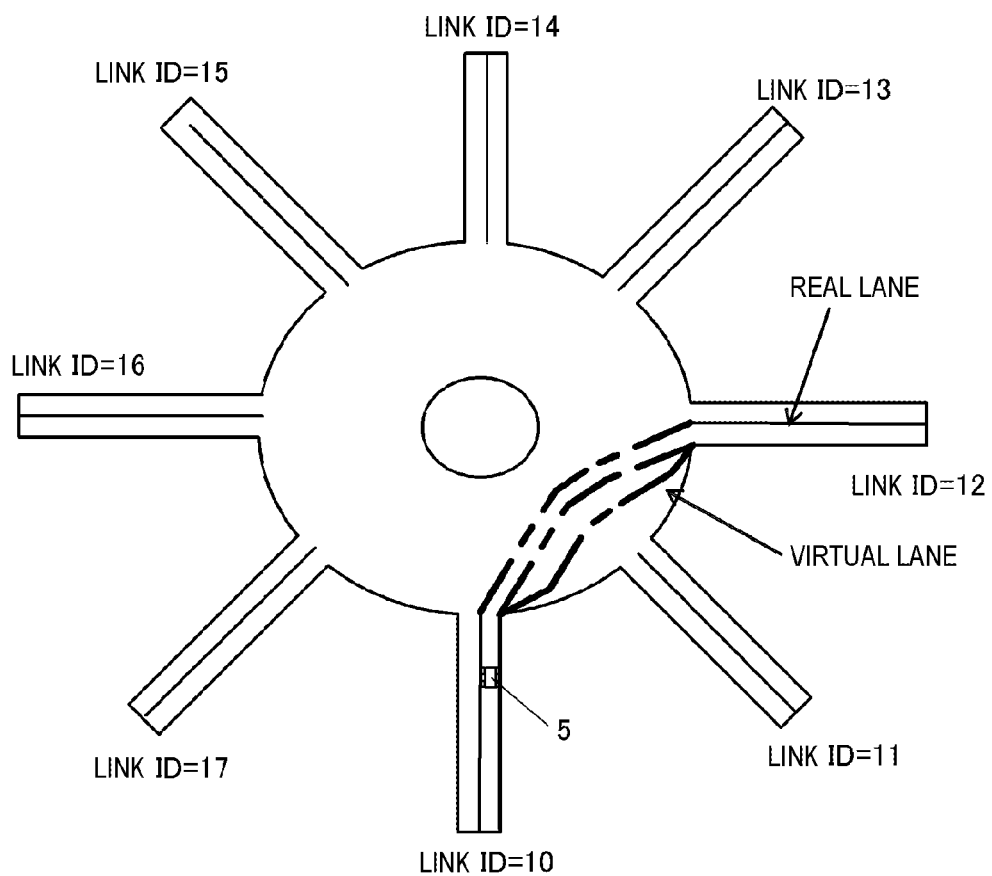
FIG. 13 is a diagram showing an example in which the plurality of virtual lanes are present at an annular intersection.

FIG. 13 shows an example in which there are a plurality of virtual lanes at an annular intersection. 8 links having link IDs=10 to 17 are connected to the node shown in the center of FIG. 13. The vehicle 5 is traveling on the current link having link ID=10. In addition, two virtual lanes connecting the link having link ID=10 to the link having link ID=12 are recorded in the map information 13a.

When the link having link ID=12 is set next to the link having link ID=10 in the calculated route, the target course generation section 28 selects the virtual lane as follows, for example (FIG. 9, step S114). In other words, the target course generation section 28 determines which one of the two virtual lanes the vehicle travels according to the number or positions of vehicles recognized using the camera 22 or the radar 21.

Operation Example 4

Figure 14:
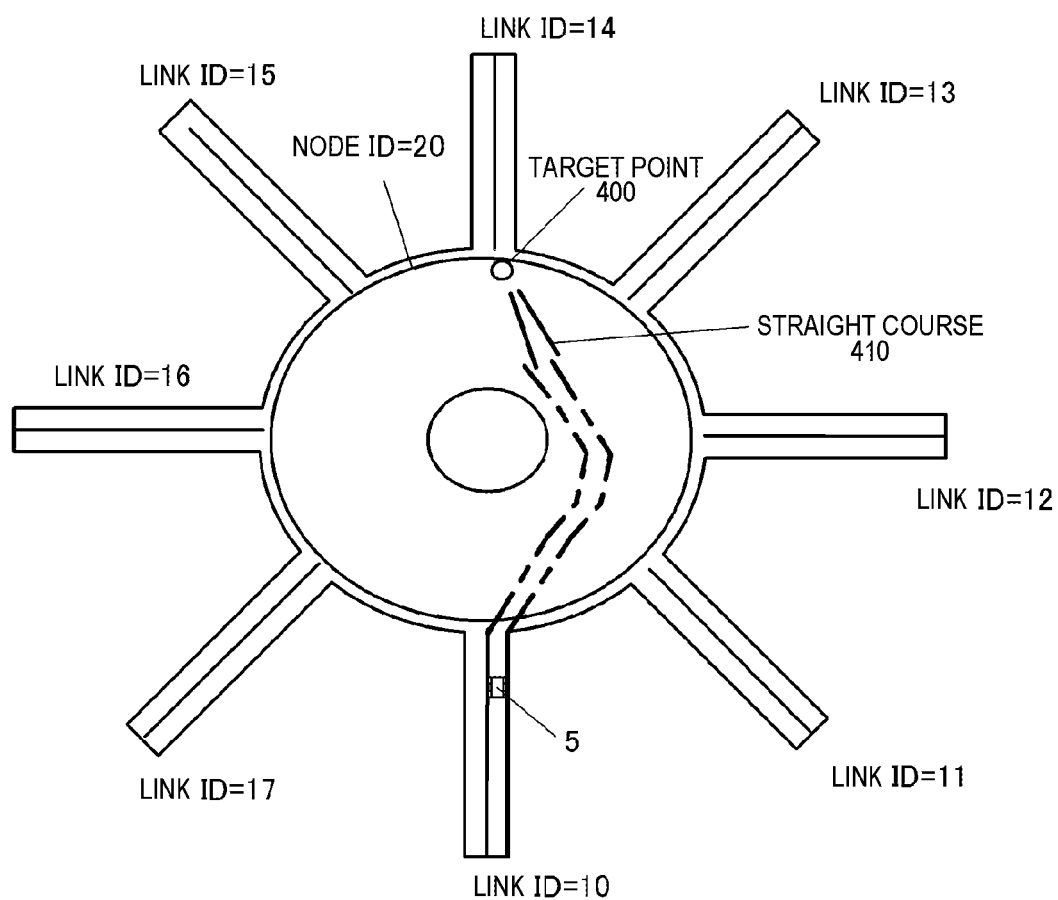
FIG. 14 is a diagram showing an example in which the virtual lane is broken at the annular intersection.

FIG. 14 shows an example in which the virtual lane is broken at an annular intersection. 8 links having link IDs=10 to 17 are connected to a node having node ID=20 shown in the center of FIG. 14. However, the node having node ID=20 is indicated by the size indicating the intersection based on the intersection size F200 stored in the map information 13a. The vehicle 5 is traveling on the current link having link ID=10. In addition, the virtual lane extending from an intersecting point of the link having link ID=10 with the annular intersection to the vicinity of the center of the annular intersection is recorded in the map information 13a. In addition, the target point 400 is an intersecting point of the link having link ID=14 with the node having node ID=20.

For example, the target course generation section 28 generates the target course as follows at the annular intersection at which the link having link ID=10 and the link having link ID=14 are connected to the node having node ID=20 and which corresponds to the node having node ID=20 from the links having link ID=10 to link ID=14. In other words, a target course corresponding to a virtual lane shown in o one-dot chain line on which an intersecting point of the link having link ID=10 with the annular intersection is set as a starting point, and a linear target course 410 connecting an endpoint of the virtual lane to the link having link ID=14 at the target point 400 are generated.

According to the above-described first embodiment, the following operational effects can be obtained.

(1) The vehicle control system 1 includes the vehicle control device 2 mounted on the vehicle 5 and the server 40 connected to the vehicle control device 2 via a network. The server 40 includes the virtual lane generation section (i.e., the server control section 49) which generates the map information 43a including the virtual lane information relating to the virtual lane virtually set on the road at least based on the traveling loci of other vehicles other than the vehicle 5 and the server communication section 42 that transmits the map information 43a including the virtual lane information generated by the virtual lane generation section to the vehicle control device 2. The vehicle control device 2 includes the vehicle communication section 14 which receives the map information 43a including the virtual lane information from the server 40, the target course generation section 28 which generates the target course of the vehicle 5 based on the virtual lane information, and the vehicle control section 39 which causes the vehicle 5 to move along the target course generated by the target course generation section 28.

Since the vehicle control system 1 is configured in this way, it is possible to obtain a target locus similar to those of other vehicles. Even if a lane boundary line is drawn, a vehicle generally moves without moving along the lane boundary line at a specific node or link. Therefore, a vehicle can avoid a collision by moving along the target locus which is the virtual lane similar to those of other vehicles.

Further, as can be seen from the fact that there is only the difference in the virtual flag F93 in FIGS. 2 and 3, since the virtual lane information can be processed almost in the same way as the information of the lane boundary line, the vehicle control using the virtual lane information is performed easily.

(2) The vehicle control device 2 includes the storage section 13 which stores the map information 13a including the node indicating the predetermined point and the link connecting between the points. The target course generation section 28 generates the target course corresponding to the virtual lane having the intersecting point of the first link with the intersection as the starting point and the linear target course connecting the endpoint of the virtual lane to the second link, when generating the target course at the intersection at which the first link and the second link are connected to the first node and corresponding to the first node from the first link to the second link.

Therefore, the vehicle control device 2 can generate the target course even when the virtual lane information does not reach the next node, and can cause the vehicle control section 39 to move the vehicle 5 along the target course.

(Modification 1)

The server control section 49 of the server 40 may generate virtual lane information by setting a virtual lane, particularly, on a tollgate exit of highway or a rotary, based on the traveling locus received from the vehicle control device 2.

Figure 15:
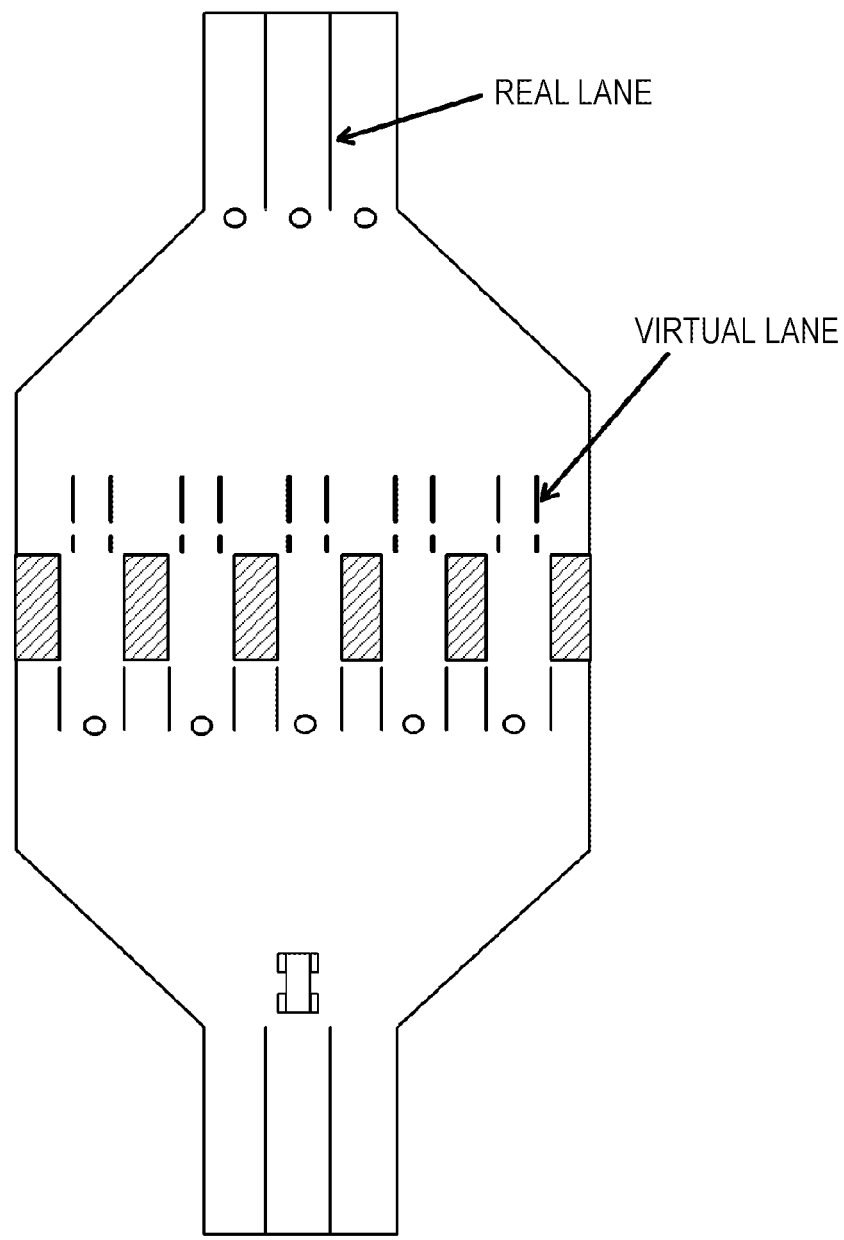
FIG. 15 is a diagram showing a generation example of the virtual lane at a tollgate exit of highway.

FIG. 15 is a diagram showing an example of generating the virtual lane at the tollgate exit of highway. The vehicle enters a tollgate at the center of FIG. 15 from the bottom of FIG. 15 and travels upward in FIG. 15. The server control section 49 generates a virtual lane indicated by a one-dot chain line in FIG. 15 based on the traveling locus received from the vehicle control device 2. The server control section 49 may grasp a position of a tollgate based on data indicating that the tollgate is a tollgate included in the map information 43a, estimate the position of the tollgate based on a pattern of a road shape included in the map information 43a, or estimate the position of the tollgate based on the traveling locus received from the vehicle control device 2. Further, this virtual lane may extend upward in FIG. 15. By setting the target course along this virtual lane, the vehicle can be prevented from approaching to other vehicles immediately after passing through a tollgate.

Figure 16:
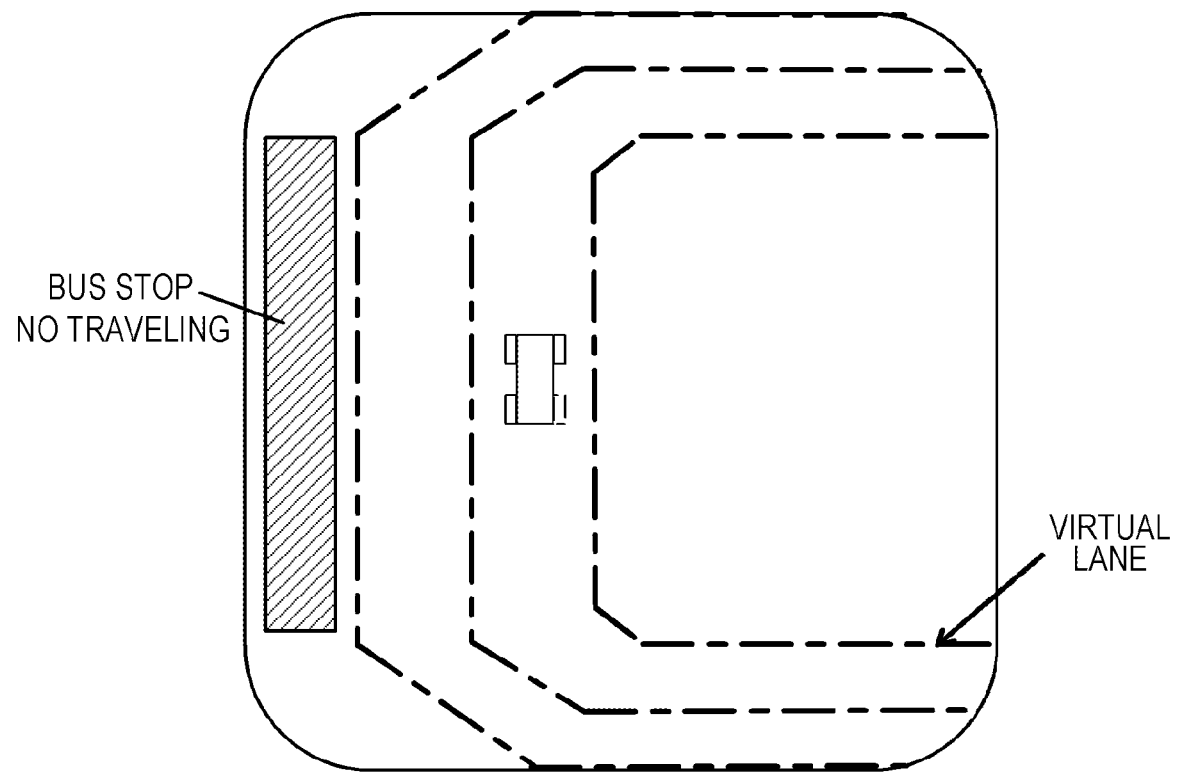
FIG. 16 is a diagram showing a generation example of map information 43a at a rotary.

FIG. 16 is a diagram showing an example of generating a virtual lane at a rotary. The hatched portion on the left end in FIG. 16 shows a dedicated bus lane and therefore traveling of a general vehicle is not permitted. For this reason, the server control section 49 generates three virtual lanes indicated by a one-dot chain line in FIG. 16 based on the traveling locus received from the vehicle control device 2, and then estimates that traveling is not permitted since there is no vehicle traveling on the lane of the left end in FIG. 16 and stores information on the fact that a vehicle cannot be traveled according to whether the intrusion of the lane is permitted F102. However, it is desirable to keep the virtual lane information when considering that it is necessary to travel on a dedicated bus lane when an emergency such as when two lanes on which a vehicle normally travels are blocked by an accident occurs.

According to the above-described Modification 1, the following operational effects can be obtained.

(1) The server 40 generates the virtual lane information relating to the virtual lane set on the exit of the tollgate of highway.

Therefore, the vehicle 5 equipped with the vehicle control device 2 can be prevented from approaching to other vehicles immediately after passing through the tollgate.

(Modification 2)

The server control section 49 of the server 40 may generate the virtual lane information at a position where the lane boundary line is not drawn on the road. In this way, at a position where it is difficult to originally predict behaviors of other vehicles since there is no lane boundary line, it is possible to avoid a collision with other vehicles since it is possible to predict that other vehicles also move along the virtual lane. In addition, if the virtual lane information is not generated at the position where the lane boundary line is drawn on the road, it is possible to avoid the overlap between the real lane and the virtual lane.

(Modification 3)

In the first embodiment described above, the vehicle control device 2 receives the map information 43a from the server 40 via the communication section 14, and stores the received the map information 43a as the map information 13a in the storage section 13. However, a method of acquiring the map information 13a is not limited thereto.

The map information 13a may be stored in the storage section 13 in advance or the vehicle control device 2 may read the map information 13a from the recording medium into the storage section 13 using a recording medium reading device (not shown).

According to the above-described Modification 3, the following operational effects can be obtained.

(1) The vehicle control device 2 is mounted on the vehicle 5. The vehicle control device 2 includes the storage section 13 which stores the map information 13a including the virtual lane information relating to the virtual lane virtually set on the road at least based on traveling loci of other vehicles other than the vehicle 5, the target course generation section 28 which generates the target course of the vehicle 5 based on the virtual lane information stored in the storage section 13, and the vehicle control section 39 which causes the vehicle 5 to move along the target course generated by the target course generation section 28.

Therefore, the vehicle control device 2 can obtain the target locus similar to those of other vehicles without communicating with the server 40.

Second Embodiment

A second embodiment of a vehicle control system and a vehicle control device is described with reference to FIGS. 17 to 19. In the following description, the same reference numerals are given to the same components as those in the first embodiment, and the difference from the first embodiment is mainly described. The points which are not particularly described are the same as those of the first embodiment. The second embodiment is different from the first embodiment mainly in that the server generates the information on the virtual lane based on accident information.

The configurations of the vehicle control system 1 and the server 40 are similar to those of the first embodiment. However, the operation of the program stored in the control section 29 of the course calculation ECU 20 is different from that of the first embodiment. In addition, the server 40 communicates with an on-road abnormality notification server (not shown) and immediately receives a notification of an occurrence location of abnormality as soon as the abnormality occurs on the road such as a traffic accident, etc. If the server 40 receives the notification of the occurrence of the abnormality, the virtual lane is set based on the traveling locus of the vehicle traveling in the vicinity of the occurrence location of the abnormality after the time to generate the virtual lane information.

(Flow Chart)

Figure 17:
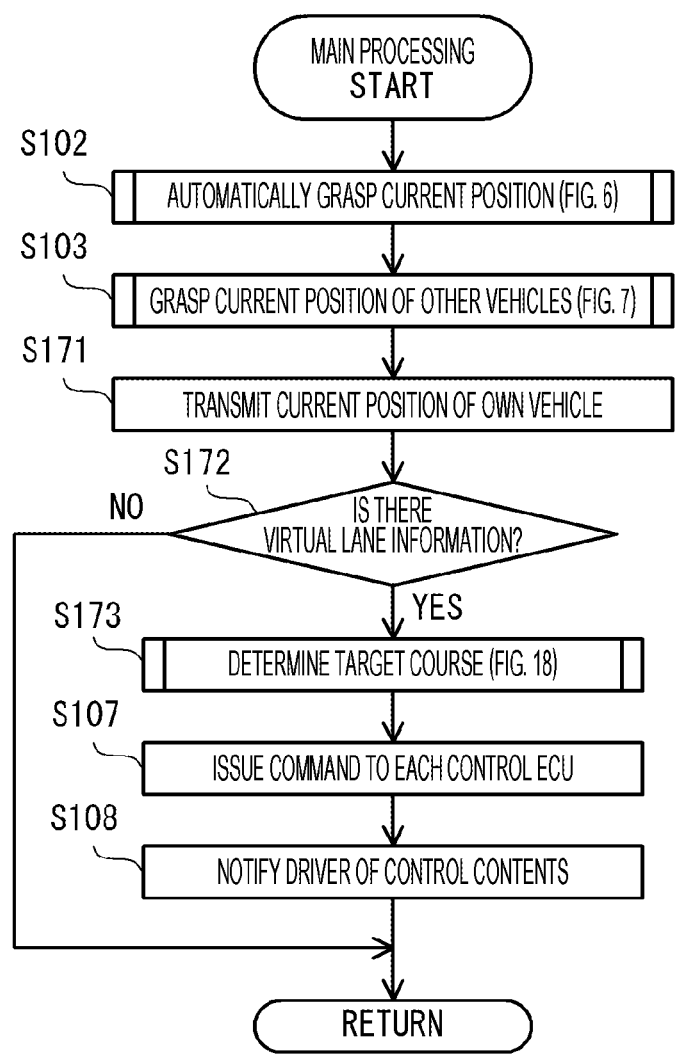
FIG. 17 is a flow chart showing an operation of main processing according to a second embodiment.

FIG. 17 is a flow chart showing the operation of the main processing executed by the control section 29 of the course calculation ECU 20 in the second embodiment. The processing similar to that in the first embodiment is denoted by the same step numbers, and the description thereof is omitted.

When the main processing starts, unlike the first embodiment, without determining whether the automatic operation is required, steps S102 and S103 are executed and the current positions of the own vehicle and other vehicles are grasped. Next, the process proceeds to step S171.

In step S171, the current position of the own vehicle acquired in step S102 is transmitted to the server 40, and a reply from the server 40 is received. The server 40 transmits a reply indicating that there is the information on the virtual lane when there is the information on the virtual lane in the vicinity of the current position of the vehicle, and transmits a reply indicating that there is no information on the virtual lane when there is no information on the virtual lane in the vicinity of the current position of the vehicle. Next, the process proceeds to step S172.

In step S172, it is determined whether a reply indicating that there is the information on the virtual lane is received from the server 40. If it is determined that the reply indicating that there is the information on the virtual lane is received, the process proceeds to step S173, and if it is determined that the reply indicating that there is the information on the virtual lane is not received, the operation of the program shown in FIG. 17 ends.

Figure 18:
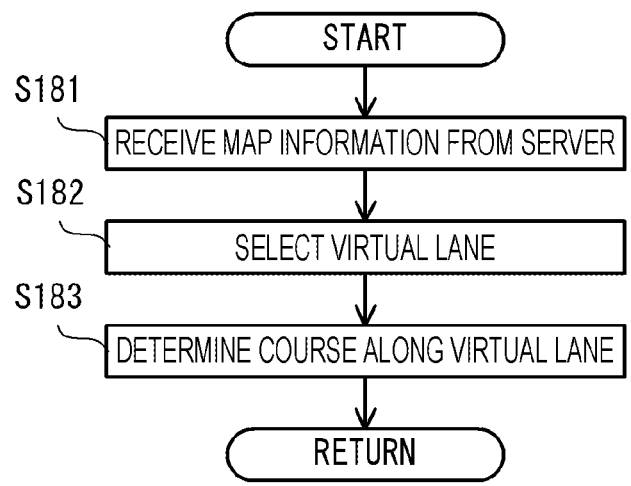
FIG. 18 is a flow chart showing processing of determining a target locus according to the second embodiment.

In step S173, the processing of determining the target course shown in detail in FIG. 18 is performed, and then the process proceeds to step S107.

The operations after step S107 are similar to those in the first embodiment, and therefore the description thereof is omitted.

FIG. 18 is a flow chart showing step S173 in FIG. 17 in detail. By the processing in this flow chart, the target locus along which the vehicle travels is determined.

In step S181, the map information 43a including the information on the virtual lane is received from the server 40, the map information 13a stored in the storage section 13 is updated using the map information 43a, and the process proceeds to step S182.

In step S182, the optimum virtual lane is selected from the map information 13a, and in the following step S183, the target course along the virtual lane selected in step S182 is determined, and the process returns to FIG. 17.

Operation Example

Figure 19:
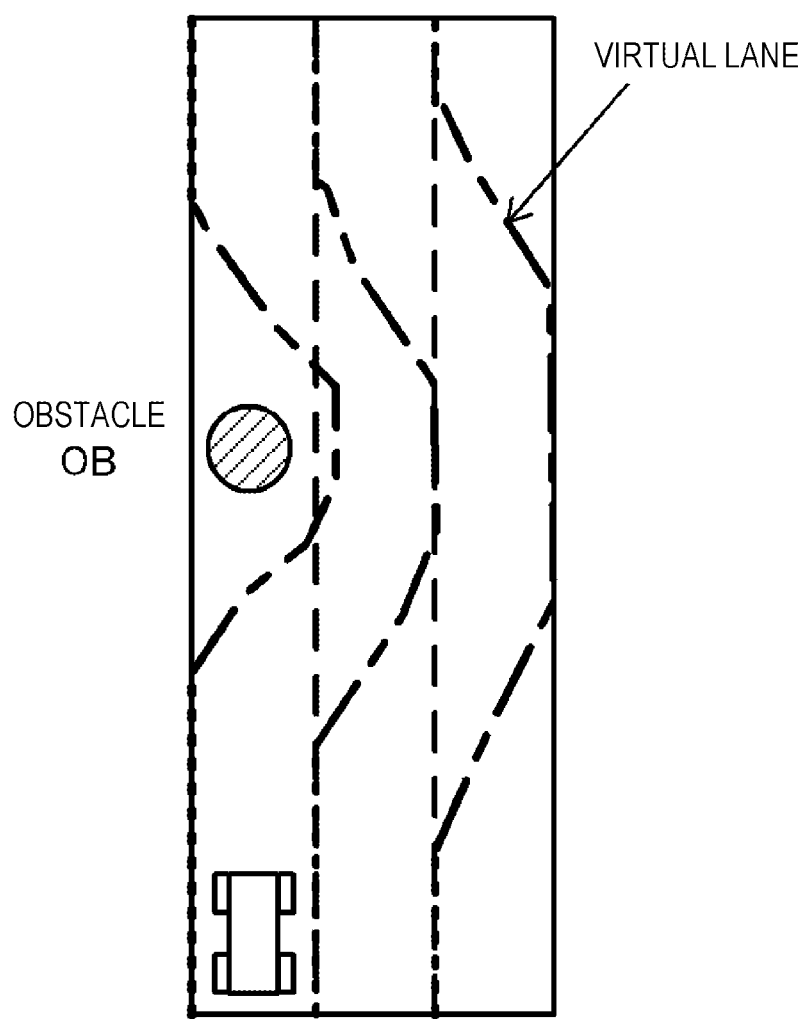
FIG. 19 is a diagram showing an example of a virtual lane when obstacles appear on a road.

FIG. 19 is a diagram showing an example of a virtual lane when an obstacle appears on a road.

If the obstacle appears on the road, the on-road abnormality notification server notifies the server 40 that an obstacle OB occurs on the road. Since vehicles traveling on a road are traveled while avoiding the obstacle OB by the driver's own operation, the traveling locus avoiding the obstacle OB is transmitted from the vehicle control device 2 mounted on these vehicles to the server 40. The server 40 generates the virtual lane information based on the traveling locus of the vehicle traveling in the vicinity of the occurrence location of the obstacle OB after receiving the notification.

Thereafter, when the vehicle control device 2 of the vehicle traveling in the vicinity of the occurrence location of the obstacle OB transmits the current position to the server 40 (step S171 in FIG. 17), the reply indicating that there is the information on the virtual lane (step S172: YES) is received from the server 40. Therefore, the vehicle control device 2 generates the target course to avoid the obstacle OB based on the virtual lane information.

According to the above-described second embodiment, the following operational effects can be obtained.

(1) The server 40 includes the server storage section 43 which stores the map information 43a including a node indicating a predetermined point and a link connecting between points. The virtual lane generation section, that is, the server control section 49 specifies the node or the link at which the accident occurs when receiving the information on the accident from the on-road abnormality notification server, and generates the virtual lane information based on the traveling locus of the vehicle traveling on the node or the link.

Therefore, the vehicle control device 2 that has received the new map information 43a from the server control section 49 can keep up with the flow of the vehicle changed due to the occurrence of the accident.

Modification of Second Embodiment

The server control section 49 may set different virtual lanes by time zone.

Figure 20:
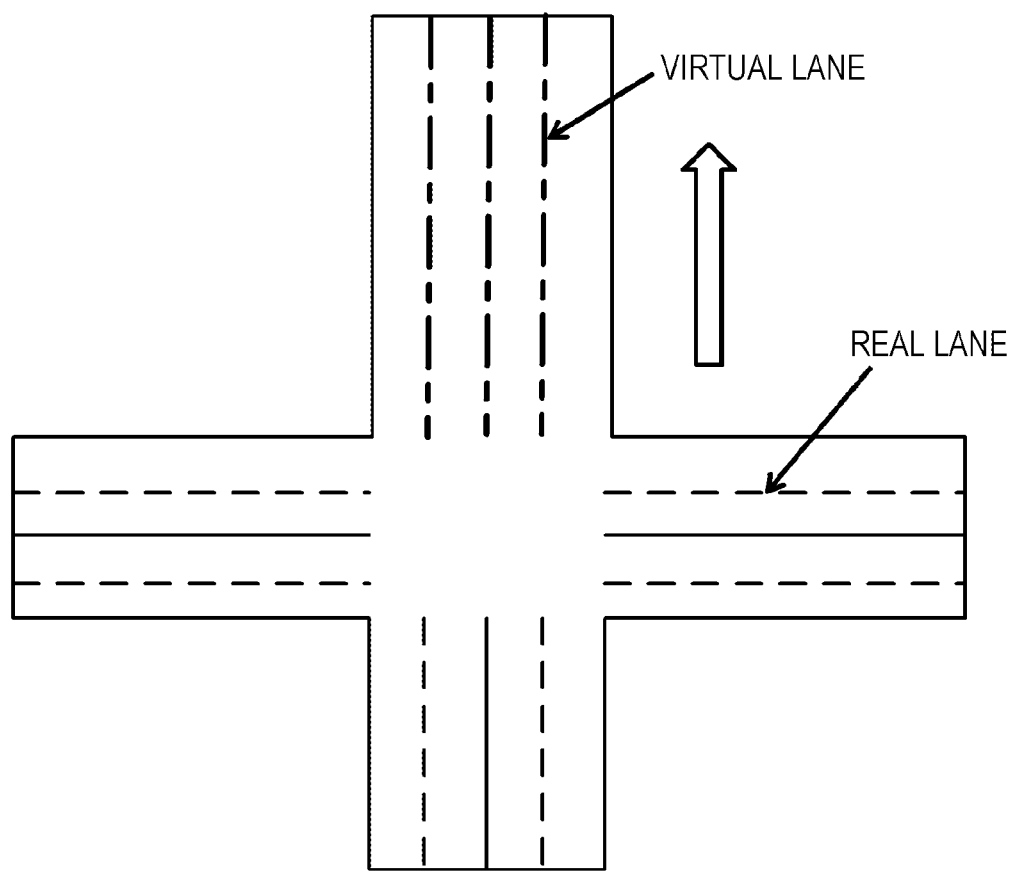
FIG. 20 is a diagram showing an example in which the virtual lane is set on a wide road on which a lane boundary line is not drawn.

FIG. 20 is a diagram showing an example in which the virtual lane is set on a wide road on which a lane boundary line is not drawn. A road on an upper part in FIG. 20 is a one way road going upward, and the lane boundary line is not drawn.

Figure 21:
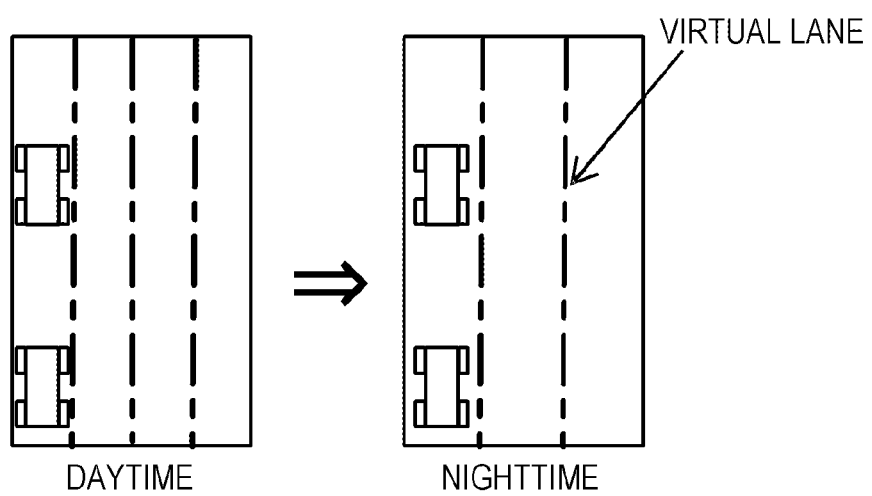
FIG. 21 is a diagram showing a traveling situation of a vehicle of each time zone on an upper road shown in FIG. 20.

FIG. 21 is a diagram showing the traveling situation of the vehicle by time zone on the road on the upper part in FIG. 20.

On the road, as shown in FIG. 21, the vehicles travel on 4 lanes during daytime when a traffic volume is increased, and the vehicles travel on 3 lanes at nighttime when the traffic volume is decreased. For this reason, the server control section 49 which has received the traveling locus from the vehicle control device 2 of these vehicles sets virtual lanes by time zone as shown in FIG. 21.

The server control section 49 may transmit the map information 43a, to which the information on the time zone is added, to the vehicle control device 2, and transmit the map information 43a including the virtual lane information corresponding to the changed traffic volume to the vehicle control device 2 at the time when the traffic volume is changed.

Third Embodiment

A third embodiment of a vehicle control system and a vehicle control device is described with reference to FIGS. 22 to 25. In the following description, the same reference numerals are given to the same components as those in the first embodiment, and the difference from the first embodiment is mainly described. The points which are not particularly described are the same as those of the first embodiment. The third embodiment is different from the first embodiment in that the vehicle control device partly generates the virtual lane information within the intersection, while in the first embodiment, all the virtual lane information is generated by the server.

The configurations of the vehicle control system 1 and the server 40 are similar to those of the first embodiment. However, the operation of the program stored in the control section 29 of the course calculation ECU 20 is different from that of the first embodiment. In addition, the server control section 49 of the server 40 performs processing to be described below to generate virtual lane information.

(Flow Chart)

Figure 22:
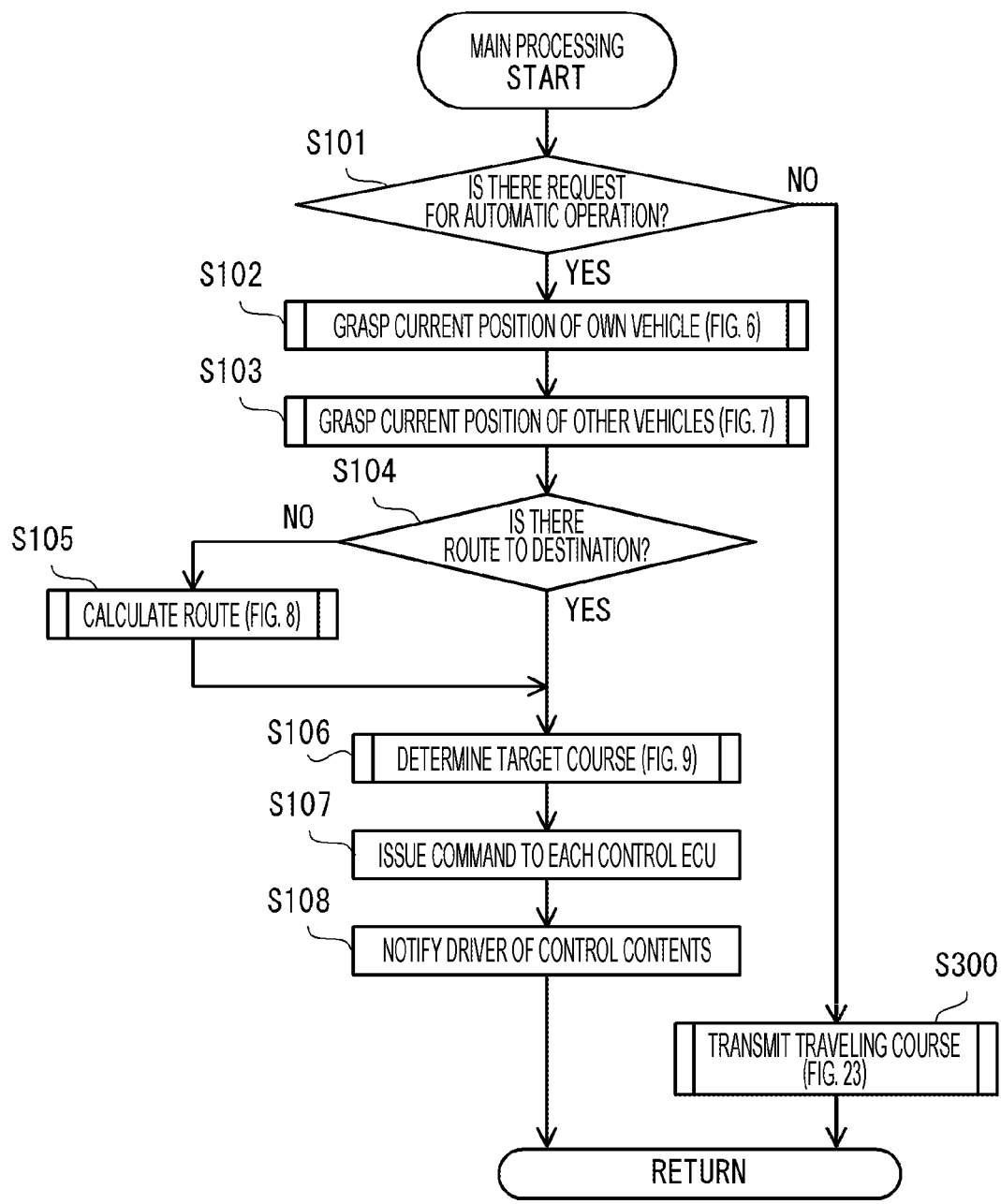
FIG. 22 is a flow chart showing an operation of main processing according to a third embodiment.

FIG. 22 is a flowchart showing the operation of the main processing executed by the control section 29 of the course calculation ECU 20 in the third embodiment. The processing similar to that in the first embodiment is denoted by the same step numbers, and the description thereof is omitted. The difference from FIG. 5 in the first embodiment is only the processing in the case where the negative determination is made in step S101.

In step S101, it is determined whether there is a request for an automatic operation by operation of the switch 12 by a driver. If it is determined that there is the request for the automatic operation, the process proceeds to step S102, and if it is determined that there is no request for the automatic operation, the process proceeds to step S300.

The operations after step S102 are similar to those in the first embodiment, and therefore the description thereof is omitted.

Figure 23:
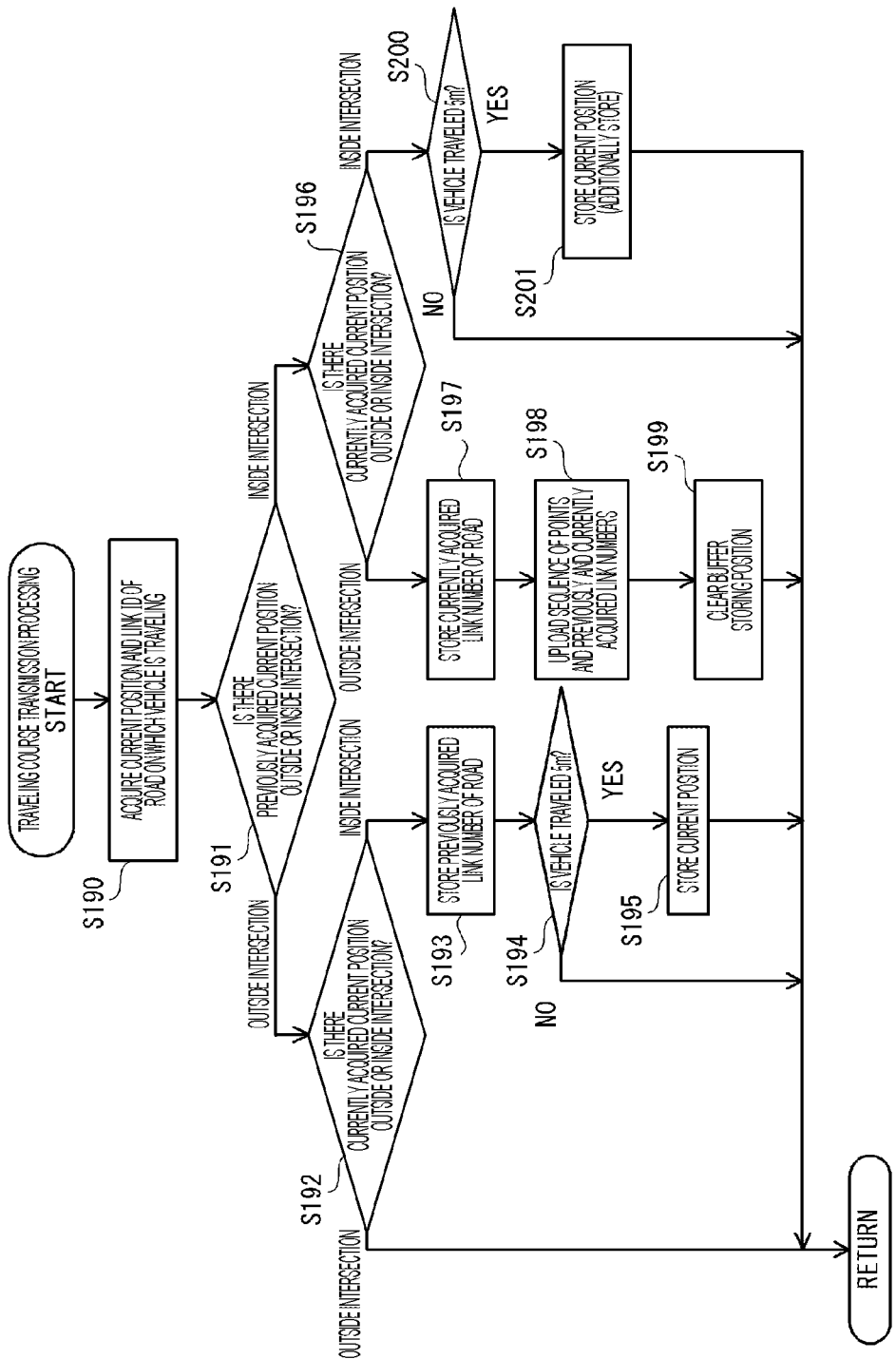
FIG. 23 is a flow chart showing traveling locus transmission processing.

In step S300, traveling locus transmission processing shown in detail in FIG. 23 is performed, and thereafter the operation of the program shown in FIG. 22 ends.

FIG. 23 is a flow chart showing the traveling locus transmission processing in step S300 of FIG. 22 in detail.

In step S190, the same processing as in step S102 is performed and the acquired current position is stored in the RAM of the control section 29. Then, the link ID corresponding to the current position is acquired with reference to the map information 13a, and is similarly stored in the RAM of the control section 29. Next, the process proceeds to step S191.

In step S191, when the previous step S190 is executed, the current position stored in the RAM is read and it is determined whether the position is inside or outside the intersection. It can be determined whether a certain position is within the intersection, for example, using the map information 13a as follows. First, the nearest node from the current position is specified and the intersection size F200 of the node is acquired. It is determined that the current position is within the intersection if the current position is less than the intersection size F200 from the node, and it is determined that the current position is outside the intersection if the current position is equal to or more than the intersection size F200 from the node. If it is determined that the previously acquired current position is outside the intersection, the process proceeds to step S192, and if it is determined that the previously acquired current position is within the intersection, the process proceeds to step S196.

In step S192, it is determined whether the current position acquired in the present step S190 is inside or outside the intersection. If it is determined that the currently acquired current position is outside the intersection, the subroutine representing the operations in FIG. 23 ends, and if it is determined that the currently acquired current position is inside the intersection, the process proceeds to step S193.

In step S193, it is determined that the vehicle has entered the intersection, and the link ID stored when the previous step S190 is executed is again stored in the RAM of the control section 29 as a transmission starting point link ID. Next, the process proceeds to step S194.

In step S194, it is determined whether the vehicle has traveled 5 m or more since the previous position was recorded, and if it is determined that the vehicle has traveled 5 m or more, the process proceeds to step S195, and if it is determined that the vehicle has not traveled 5 m or more, the operations in the subroutine shown in FIG. 23 ends.

In step S195, the current position obtained in the current step S190 is again stored in the RAM of the control section 29 as the transmission traveling locus, and the operations in the subroutine shown in FIG. 23 ends.

In step S196 executed when the current position is inside the intersection in step S191, it is determined whether the current position acquired in the present step S190 is inside or outside the intersection. If it is determined that the currently acquired current position is outside the intersection, the process proceeds to step S197, and if it is determined that the current position is within the intersection, the process proceeds to step S200.

In step S197, it is determined that the current position is outside the intersection, and the link ID stored when the present step S190 is executed is again stored in the RAM of the control section 29 as a transmission ending point link ID. Next, the process proceeds to step S198.

In step S198, the transmission starting point link ID, one or a plurality of transmission traveling loci, and the transmission ending point link ID which are stored in the RAM of the control section 29 are transmitted to the server 40, and the process proceeds to step S199.

In step S199, the buffer storing the position information is cleared, that is, the transmission starting point link ID, the transmission traveling locus and the transmission ending point link ID are deleted from the RAM of the control section 29, and the subroutine representing the operations in FIG. 23 ends.

In step S200 executed when the current position is inside the intersection in step S196, it is determined whether the vehicle has traveled 5 m or more since the previous position was recorded, if it is determined that the vehicle has traveled 5 m or more, the process proceeds to step S201, and if it is determined that the vehicle has not traveled 5 m or more, the subroutine representing the operations in FIG. 23 ends.

In step S201, the current position acquired in the present step S190 is again stored in the RAM of the control section 29 as the transmission traveling locus. However, when the transmission traveling locus is already stored in the RAM of the control section 29, it is stored as the additional transmission traveling locus. In other words, by the processing of the present step, the current position is stored every time the vehicle has traveled a certain distance within the intersection. By doing so, a subroutine representing the operations in FIG. 23 ends.

Figure 24:
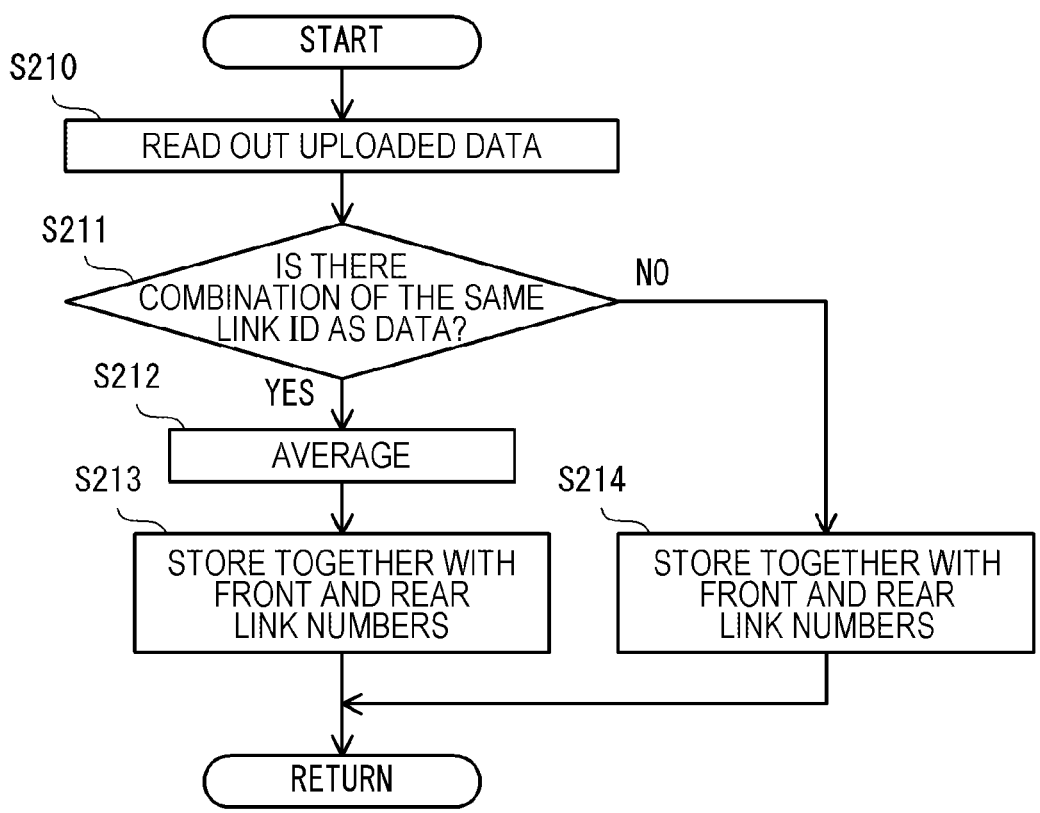
FIG. 24 is a flow chart showing generation processing of a virtual lane.

FIG. 24 is a flow chart showing the operation of the program executed in the server 40 if the transmission of the information is received from the vehicle control device 2 in step S198 of FIG. 23. The execution entity of each step described below is the CPU of the server control section 49.

In step S210, the information received from the vehicle control device 2 is read out from the server communication section 42, and the process proceeds to step S211.

In step S211, it is determined whether there is a combination of the same link IDs as the currently received data among the data accumulated so far. However, the combination of the link IDs means the combination of the link IDs in which the transmission starting point link ID matches the transmission ending point link ID. If it is determined that there is the matched data, the process proceeds to step S212, and if it is determined that there is no matched data, the process proceeds to step S214.

In step S212, the existing transmission traveling locus and a newly received transmission traveling locus is averaged. The averaging means that how many received data the accumulated data is averaged is stored and a weighted average is performed with the currently received transmission traveling locus. Since it is only necessary to calculate the average of the coordinate values in order from the first point of the traveling locus by fixing the position of the starting point of the received transmission traveling locus and keeping the interval of the traveling locus constant, the processing can be simplified. Next, the process proceeds to step S213.

In step S213, the traveling loci averaged by the processing of step S212 are connected to each other to be represented by a line segment, a predetermined road width is given thereto, and are stored in the map information 43a as the virtual lane information together with the transmission starting point link ID and the transmission ending point link ID. In this way, the operation of the program shown in FIG. 24 ends.

In step S214, the received traveling loci are connected to each other to be represented by a line segment, a predetermined road width is given thereto, and are stored in the map information 43a as the virtual lane information together with the transmission starting point link ID and the transmission ending point link ID. In this way, the operation of the program shown in FIG. 24 ends.

Operation Example

Figure 25:
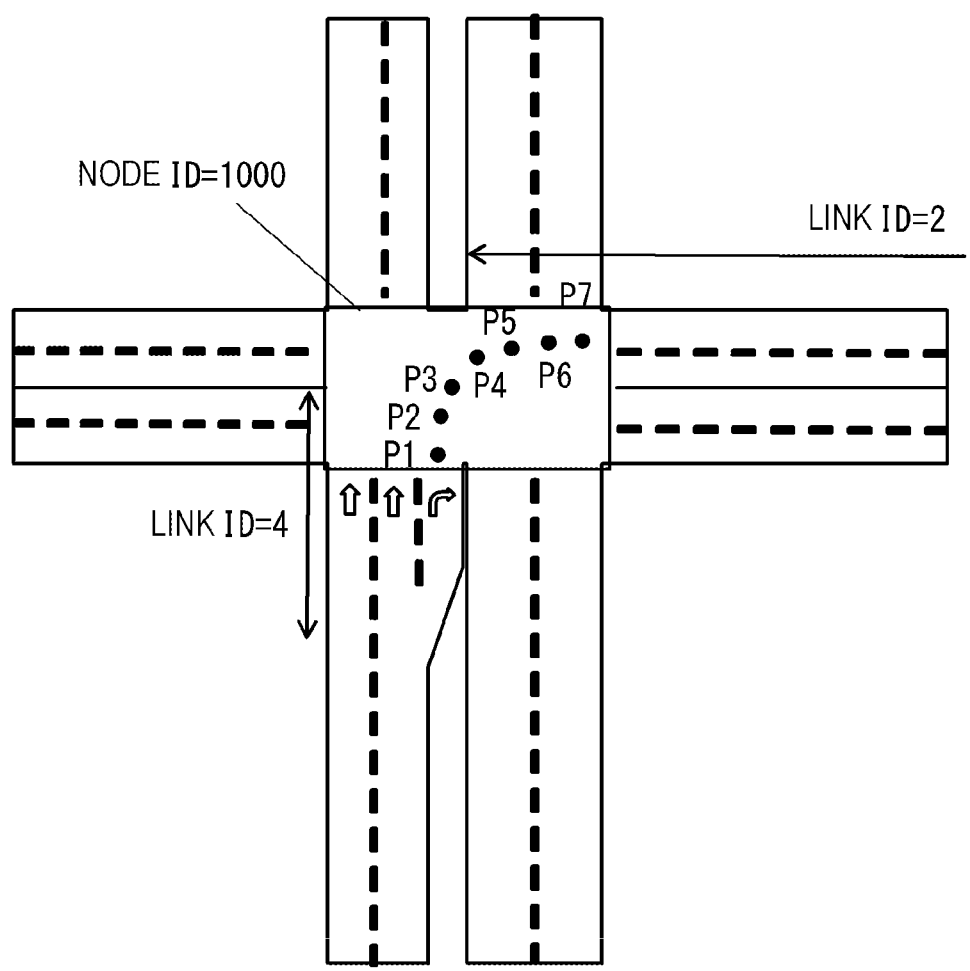
FIG. 25 is a diagram showing an example of a transmission traveling locus.

FIG. 25 is a diagram showing an example of a transmission traveling locus transmitted from the vehicle control device 2 to the server 40. In the example shown in FIG. 25, the vehicle equipped with the vehicle control device 2 moves from the link having link ID=4 to the link having link ID=2 via a node having node ID=1000. At this time, the vehicle equipped with the vehicle control device 2 had the traveling locus of P1 to P7 within the intersection. However, in FIG. 25, the size of the node having node ID=1000 is drawn in accordance with the size of the intersection.

In this case, the link ID=4 as the transmission starting point link ID, the link ID=2 as the transmission ending point link ID, and the position information of the P1 to P7 as the transmission traveling locus are transmitted from the vehicle control device 2 to the server 40.

Figure 26:
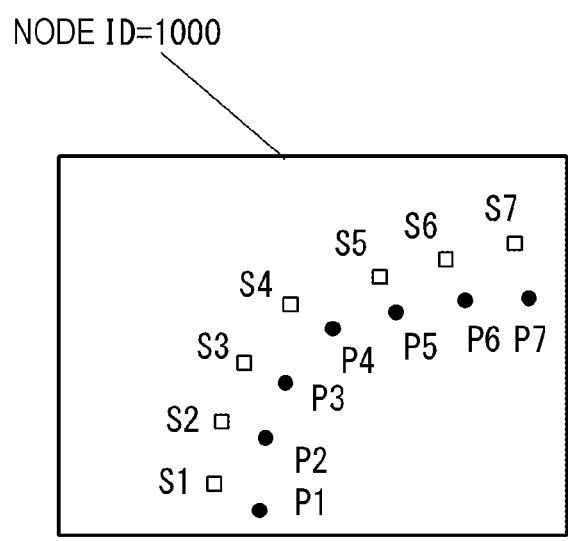
FIG. 26 is a diagram showing transmission traveling loci S1 to S7 stored in a server and transmission traveling loci P1 to P7 transmitted to the server.

FIG. 26 is a diagram showing the transmission traveling loci S1 to S7 accumulated in the server 40, and the transmission traveling loci P1 to P7 transmitted from the vehicle control device 2 to the server 40, which is described with reference to FIG. 25. However, only the inside of the node having node ID=1000 in FIG. 25 is shown in FIG. 26. In step S212 of FIG. 24, the server control section 49 calculates the average value of each coordinate of the transmission traveling loci S1 to S7 and the transmission traveling loci P1 to P7 when, for example, the accumulated transmission traveling loci S1 to S7 are generated from data received once. For example, when the accumulated transmission traveling loci S1 to S7 are generated from data received twice, the server control section 49 calculates the weighted average of the transmission traveling loci S1 to S7 and the transmission traveling loci P1 to P7, that is, a value internally dividing each coordinate into 1:2.

According to the above-described third embodiment, the following operational effects can be obtained.

(1) The vehicle control device 2 includes the storage section 13 which stores the map information 13a including the node indicating the predetermined point and the link connecting between the points, and the navigation control section 19 which transmits the information relating to the course along which the vehicle has traveled to the server 40 via the vehicle communication section when the vehicle 5 has traveled at the intersection corresponding to the node.

(2) The link included in the map information 13a is associated with an identifiable code, that is, the link ID, and the navigation control section 19 transmits the link IDs each associated with the links corresponding to the roads as the information for identifying the road on which the vehicle 5 has traveled just before and after the intersection together with the information relating to the locus along which the vehicle 5 has traveled to server 40.

Therefore, the server control section 49 can easily generate the virtual lane information relating to the virtual lane connecting the first link to the second link by using the information received from the vehicle control device 2.

Modification of Third Embodiment

In the third embodiment, if the combination of the same link IDs as the currently received data exists among the data accumulated so far (in step S211: YES in FIG. 24), the server 40 performs averaging of the existing transmission traveling locus and a newly received transmission traveling locus (step S212). However, when the distance between the existing transmission traveling locus and the newly received transmission traveling locus is separated by a predetermined distance or more, a new virtual lane may be generated using the received transmission traveling locus without performing the averaging processing on the existing transmission traveling locus. In addition, when the transmission traveling locus is received from the plurality of vehicle control devices 2, the virtual lane may be generated using only the received transmission traveling locus within the predetermined distance. In this case, as shown in FIG. 14, the virtual lane which does not arrive to the starting point of the link having the transmission ending point link ID is generated.

Fourth Embodiment

A fourth embodiment of a vehicle control device is described with reference to FIG. 27. In the following description, the same reference numerals are given to the same components as those in the third embodiment, and the difference from the third embodiment is mainly described. The matters which are not particularly described are the same as those of the third embodiment. The fourth embodiment is different from the third embodiment mainly in that the vehicle control device generates the virtual lane information.

Figure 27:
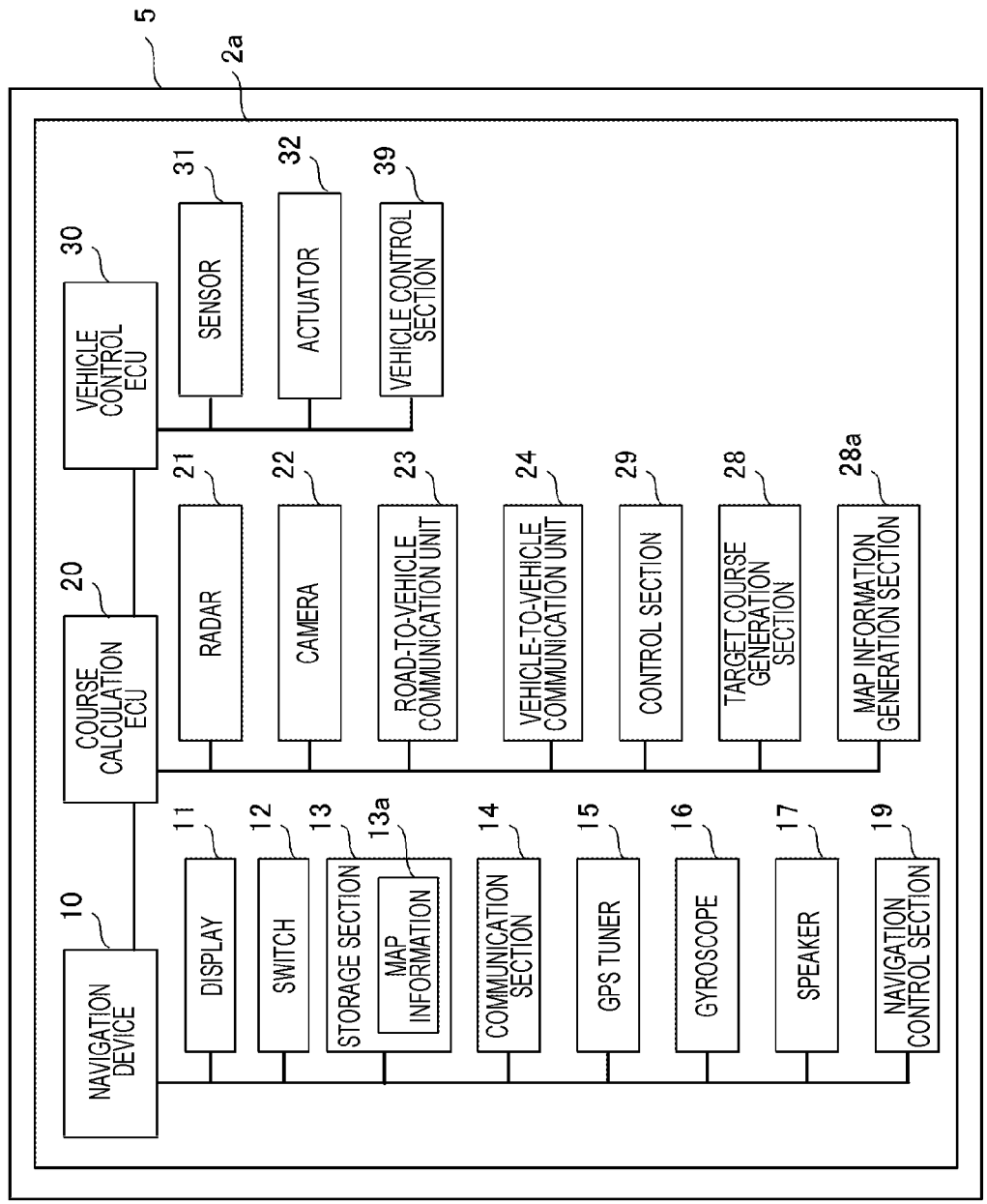
FIG. 27 is a block diagram showing a configuration of a vehicle control device according to a fourth embodiment.

FIG. 27 is a block diagram showing a configuration of a vehicle control device 2a according to the fourth embodiment. The configuration of the vehicle control device 2a includes a map information generation section 28a in addition to the configuration of the first embodiment.

The navigation control section 19 transmits the traveling locus of the vehicle to other vehicles via at least one of the communication section 14, the road-to-vehicle communication unit 23, and the vehicle-to-vehicle communication unit 24. However, the traveling locus of the vehicle may be temporarily stored in other devices and then transmitted from other vehicles.

The map information generation section 28a receives the traveling loci of other vehicles via at least one of the communication section 14, the road-to-vehicle communication unit 23, and the vehicle-to-vehicle communication unit 24, and performs the processing similar to that of the server control section in the second embodiment or the third embodiment to generate the map information 13a.

The map information generation section 28a may transmit the whole or a part of the generated map information 13a to other vehicles via at least one of the communication section 14, the road-to-vehicle communication unit 23, and the vehicle-to-vehicle communication unit 24.

According to the above-described fourth embodiment, the following operational effects can be obtained.

(1) The vehicle control device 2a includes at least one of the vehicle communication section which receives the traveling loci of other vehicles, that is, the communication section 14, the road-to-vehicle communication unit 23, and the vehicle-to-vehicle communication unit 24, the virtual lane generation section (i.e., map information generation section 38a) which generates the virtual lane information relating to the virtual lane virtually set on the road based on the traveling loci of other vehicles received by the vehicle communication section, the target course generation section 28 which generates the target course of the vehicle based on the virtual lane information, and the vehicle control section 39 which causes the vehicle to move along the target course generated by the target course generation section 28.

Therefore, it is possible to obtain the target locus similar to those of other vehicles using the virtual lane information generated by the vehicle control device 2a.

Each of the embodiments and modifications described above may be combined.

Although various embodiments and modifications have been described above, the present invention is not limited to these contents. Other aspects considered within the scope of the technical idea of the present invention are also within the scope of the present invention.

Contents of disclosure of the following application that can serve as a basis of priority claim are incorporated herein as a reference.

Japanese Patent Application No. 2015-204670 (filed on Oct. 16, 2015)

REFERENCE SIGNS LIST 1 vehicle control system
2 vehicle control device
5 vehicle
10 navigation device
13 storage section
13a map information
14 vehicle communication section
18 route calculation section
19 navigation control section
20 course calculation ECU
30 vehicle control ECU
28 target course generation section
29 control section
39 vehicle control section
40 server
42 server communication section
43 server storage section
43a map information
49 server control section

The invention claimed is:

1. A vehicle control system comprising:
a vehicle control device mounted on a vehicle; and
a server connected to the vehicle control device via a network, wherein the server includes a first controller, the first controller comprising a first non-transitory computer-readable medium storing a first computer program therein, which, when executed, causes the first controller to:
generate virtual lane information relating to a virtual lane virtually set on a road based on traveling loci of other vehicles other than the vehicle; and
transmit the generated virtual lane information to the vehicle control device;
wherein the vehicle control device includes a second controller, the second controller comprising a second non-transitory computer-readable medium storing a second computer program therein, which, when executed, causes the second controller to:
receive the virtual lane information from the server;
determine that the virtual lane exists within a forward road portion a predetermined distance from a current travel location of the vehicle;
select the received virtual lane responsive to determining that the virtual lane exists within the forward road portion;
generate a target course of the vehicle based on the received virtual lane information; and
cause the vehicle to move along the generated target course.

2. The vehicle control system according to claim 1, wherein the first controller generates the virtual lane information at a position at which a lane boundary line is not drawn on the road.

3. The vehicle control system according to claim 1, wherein the second controller within the vehicle control device is further configured to transmit information relating to a locus along which the vehicle has traveled to the server when the vehicle travels to an intersection.

4. The vehicle control system according to claim 3, wherein the second controller transmits, to the server, information for identifying a road on which the vehicle has traveled just before and after the intersection, together with the information relating to the locus along which the vehicle has traveled.

5. The vehicle control system according to claim 1, wherein the virtual lane is set between a first link and a predetermined position within the intersection, with respect to an intersection connecting the first link to a second link, and the the second controller generates the target course corresponding to the virtual lane and a linear target course connecting an endpoint of the virtual lane to the second link.

6. The vehicle control system according to claim 1, wherein the first controller generates the virtual lane information relating to a virtual lane set at a tollgate exit of highway.

7. The vehicle control system according to claim 1, wherein the first controller generates the virtual lane information based on a traveling locus along which the vehicle has traveled in the vicinity of a location where abnormality occurs when the abnormality occurs on a road.

8. The vehicle control device according to claim 1, wherein the first controller is further configured to generate the virtual lane based on a time zone.

9. The vehicle control device according to claim 1, wherein the second controller is further configured to:
   determine a collision possibility associated with the target course;
   determine the collision possibility meets a predetermined collision threshold;
   change the target course responsive to the determination that the collision possibility meets the collision threshold.

10. The vehicle control device according to claim 1, wherein the controller is configured to generate the virtual lane based on hierarchical map information, wherein the map information comprises a mesh having a plurality of nodes, wherein each of the plurality of nodes corresponds to a point on the road, and wherein a distance between nodes is variable.

11. A vehicle control device mounted on a vehicle and including a controller, the controller comprising a non-transitory computer-readable medium storing a computer program therein, which, when executed, causes the controller to:
   receive virtual lane information relating to a virtual lane virtually set on a road;
   determine that the received virtual lane exists within a forward road portion a predetermined distance from a current travel location of the vehicle;
   select the received virtual lane responsive to determining that the virtual lane exists within the forward road portion;
   generate a target course of the vehicle based on the received virtual lane information; and
   cause the vehicle to move along the generated target course.

12. The vehicle control device according to claim 11, wherein the controller within the vehicle control device is further configured to transmit information relating to a locus along which the vehicle has traveled to a server when the vehicle travels to an intersection.

13. The vehicle control device according to claim 12, wherein the controller transmits, to the server, information for identifying a road on which the vehicle has traveled just before and after the intersection, together with the information relating to the locus along which the vehicle has traveled.

14. The vehicle control device according to claim 11, wherein the virtual lane is set between a first link and a predetermined position within an intersection, with respect to the intersection connecting the first link to a second link, and the controller is configured to generate the target course corresponding to the virtual lane information and a linear target course connecting an endpoint of the virtual lane to the second link.

15. A vehicle control device mounted on a vehicle and including a controller, the controller comprising a non-transitory computer-readable medium storing a computer program therein, which, when executed, causes the controller to:
   store virtual lane information relating to a virtual lane virtually set on a road based on traveling loci of other vehicles other than the vehicle;
   determine that the stored virtual lane exists within a forward road portion a predetermined distance from a current travel location of the vehicle;
   select the stored virtual lane responsive to determining that the virtual lane exists within the forward road portion;
   generate a target course of the vehicle based on the stored virtual lane information; and
   cause the vehicle to move along the generated target course.

* * * * *